United States Patent
Ross

(10) Patent No.: US 12,540,671 B2
(45) Date of Patent: Feb. 3, 2026

(54) TRANSMISSION, A RING GEAR THEREOF, AND A METHOD OF OPERATING THE SAME

(71) Applicant: Martin Dale Ross, Salmo (CA)

(72) Inventor: Martin Dale Ross, Salmo (CA)

( * ) Notice: Subject to any disclaimer, the term of this patent is extended or adjusted under 35 U.S.C. 154(b) by 157 days.

(21) Appl. No.: 18/353,598

(22) Filed: Jul. 17, 2023

(65) Prior Publication Data

US 2025/0027562 A1    Jan. 23, 2025

(51) Int. Cl.
    *F16D 41/16*      (2006.01)
    *F16H 55/17*      (2006.01)
    (Continued)

(52) U.S. Cl.
CPC .............. *F16H 63/18* (2013.01); *F16D 41/16* (2013.01); *F16H 55/17* (2013.01); *F16H 57/08* (2013.01); *F16H 63/304* (2013.01); *F16H 2055/176* (2013.01); *F16H 63/3013* (2013.01); *F16H 2063/3056* (2013.01);
(Continued)

(58) Field of Classification Search
CPC .......... F16H 63/18; F16H 55/17; F16H 57/08; F16H 63/304; F16H 63/3013; F16H 2055/176; F16H 2063/3056; F16H 2063/3076; F16H 2200/0043; F16H 2200/0056; F16H 2200/2079; F16D 41/16; B60Y 2400/427
See application file for complete search history.

(56) References Cited

U.S. PATENT DOCUMENTS 3,766,805 A    10/1973   Shea et al.
8,235,859 B2    8/2012    Yun
(Continued)

FOREIGN PATENT DOCUMENTS

CN      107076225 A   *   8/2017  ............ F16D 23/00
CN      212318686 U      1/2021
(Continued)

OTHER PUBLICATIONS

Atsushi Mano. Overview of Gearbox Development for Formula One. Honda R&D Technical Review F1 Special (The third Era Activities). Dec. 1, 2009. Honda R&D. https://www.hondarandd.jp/point.php?pid=592lang=en. Accessed Jul. 10, 2023.
(Continued)

*Primary Examiner* — Justin Holmes

(57) ABSTRACT

A ring gear for a planetary gearset and a transmission having the same. The planetary gearset receives an input via a sun shaft to supply an output via a carrier in response to arresting of rotation of the ring gear around an axis. The ring gear includes a plurality of tooth surfaces and opposing tooth surfaces that are distributed around the axis. A pawl, while engaged with the tooth surfaces, is permitted to ratchet on the ring gear in a first angular direction and arrests rotation of the ring gear in a second angular direction opposite to the first angular direction. An opposing pawl, while engaged with the opposing tooth surfaces, is permitted to ratchet on the ring gear in the second angular direction and arrests rotation of the ring gear in the first angular direction. A gear ratio is selected by selectively actuating the pawls and the opposing pawls.

20 Claims, 20 Drawing Sheets

(51) Int. Cl.
  *F16H 57/08* (2006.01)
  *F16H 63/18* (2006.01)
  *F16H 63/30* (2006.01)

(52) U.S. Cl.
  CPC .............. *F16H 2063/3076* (2013.01); *F16H 2200/0043* (2013.01); *F16H 2200/0056* (2013.01); *F16H 2200/2079* (2013.01)

(56) References Cited

U.S. PATENT DOCUMENTS

| | | | |
|---|---|---|---|
| 8,272,488 B2 * | 9/2012 | Eisengruber | F16D 41/125 192/114 R |
| 8,403,800 B2 | 3/2013 | Serkh et al. | |
| 8,992,375 B2 | 3/2015 | Gobel et al. | |
| 2007/0275811 A1 | 11/2007 | Starik | |
| 2010/0122883 A1 * | 5/2010 | Bartos | F16D 41/14 192/43.1 |
| 2011/0147155 A1 * | 6/2011 | Heitzenrater | F16H 63/3026 192/55.1 |
| 2012/0071290 A1 | 3/2012 | Byun | |

FOREIGN PATENT DOCUMENTS

| | | |
|---|---|---|
| DE | 102013208220 A1 | 11/2014 |
| DE | 102019220044 A1 | 6/2021 |
| DE | 102022201482 B3 | 1/2023 |
| EP | 2028096 A1 | 2/2009 |
| EP | 2567888 A1 | 3/2013 |
| FR | 364844 A | 8/1906 |
| JP | H06263080 A | 9/1994 |
| KR | 20230095296 A * | 6/2023 |

OTHER PUBLICATIONS

Takashi Yoshioka Takeshi Uchiyama Katsumi Kubo Ryo Matsui. Development of Seamless Shift for Formula One Car. Honda R&D Technical Review F1 Special (The third Era Activities). Dec. 1, 2009. Honda R&D. https://www.hondarandd.jp/point.php?pid=631 &lang=en. Accessd Jul. 10, 2023.

* cited by examiner

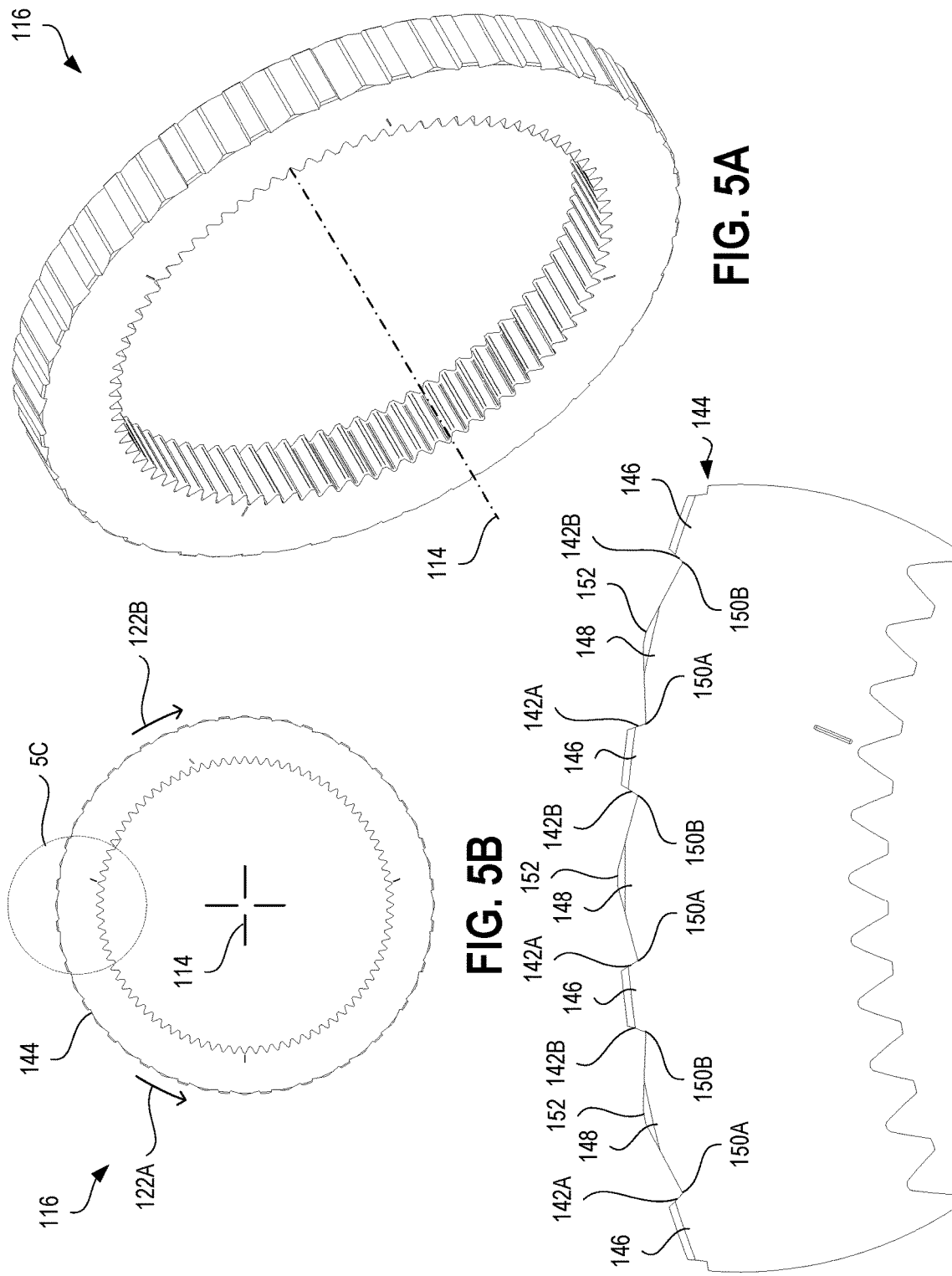

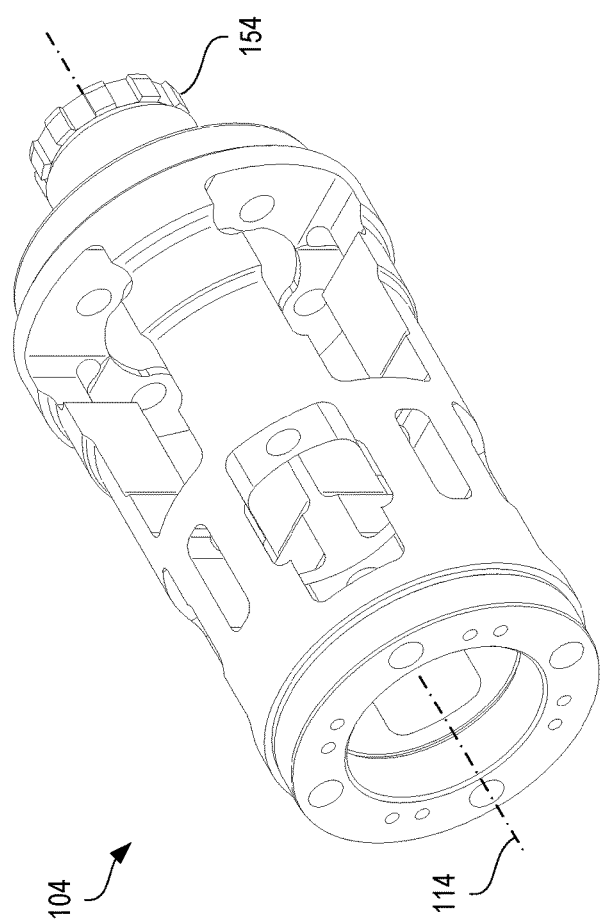
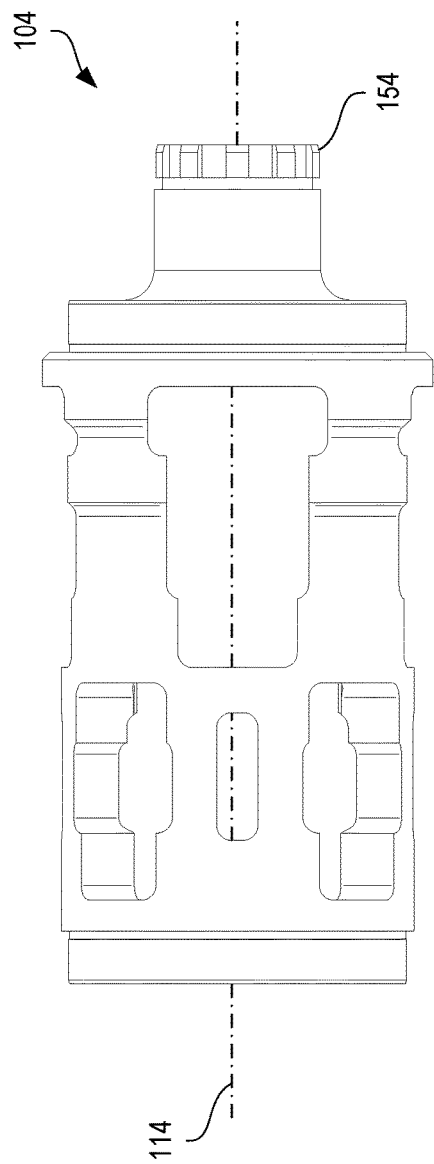
FIG. 7A
FIG. 7B

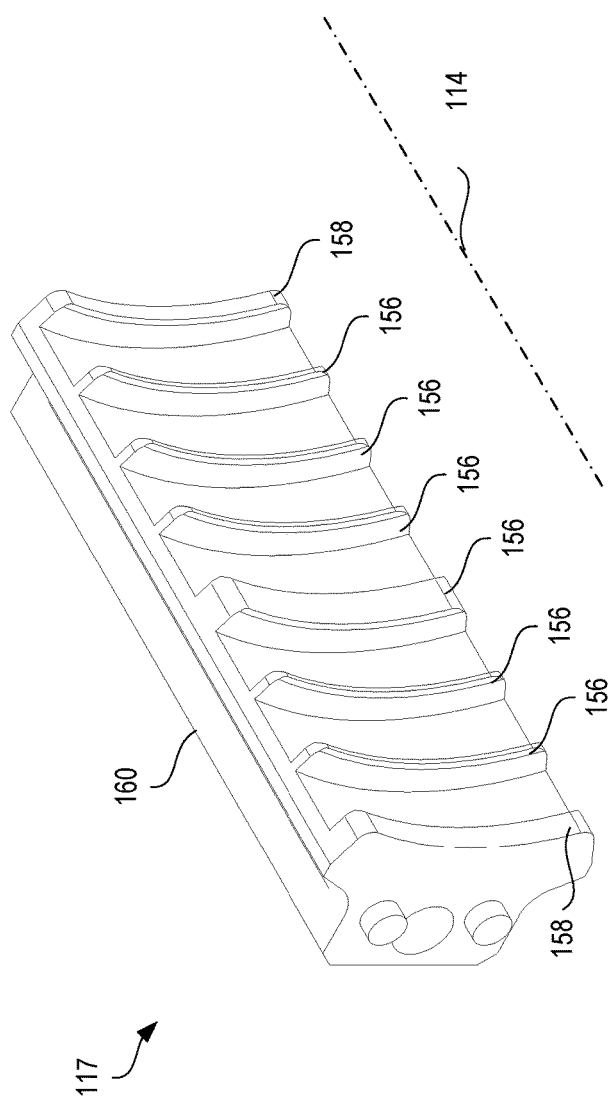
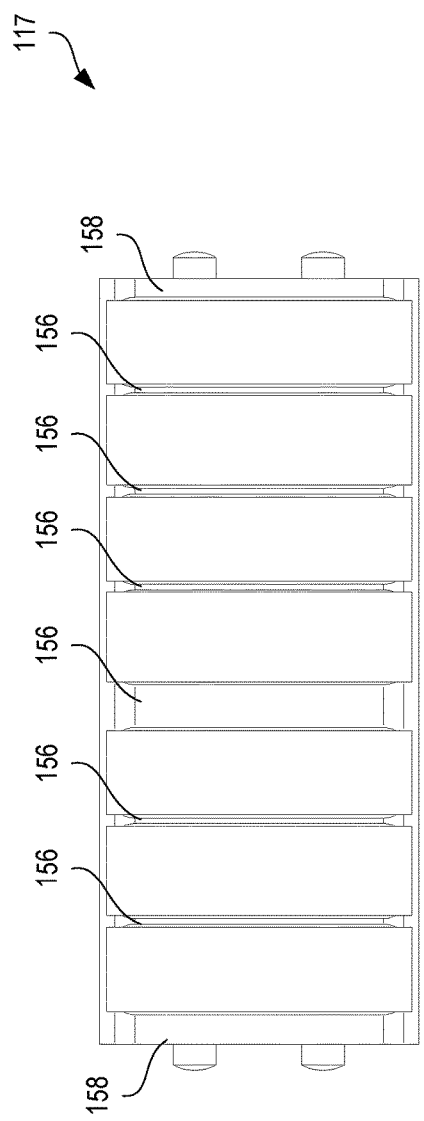

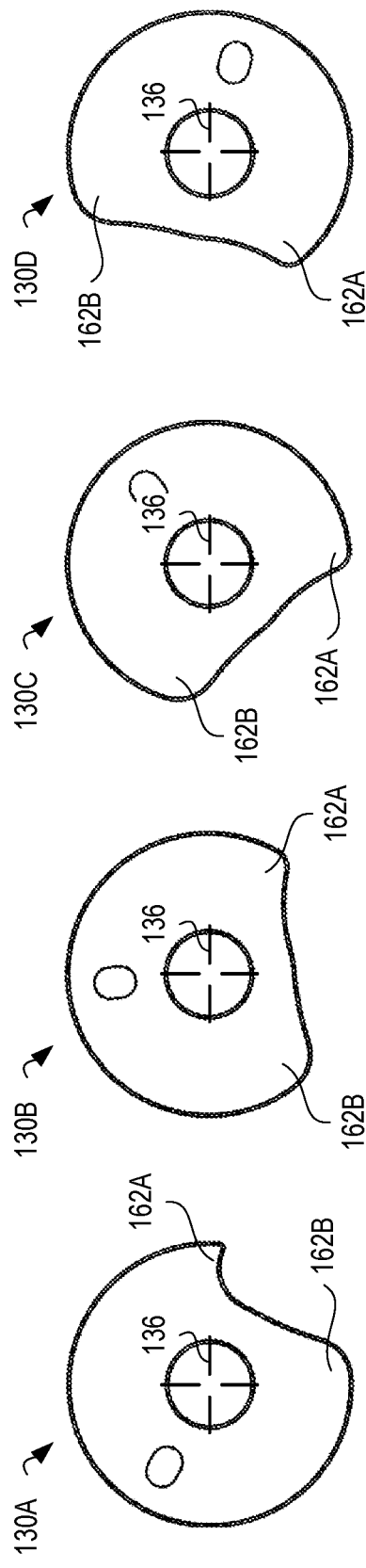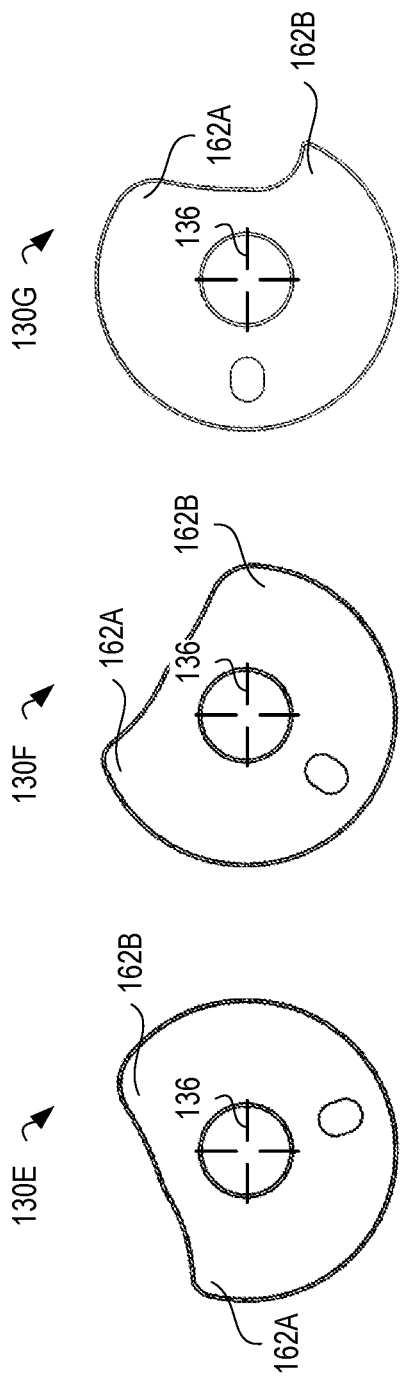

TRANSMISSION, A RING GEAR THEREOF, AND A METHOD OF OPERATING THE SAME

TECHNICAL FIELD

The disclosure relates generally to transmissions for providing selectable gear ratios, and more particularly to planetary gearset-based transmissions.

BACKGROUND

Electrification of transport is an important component of a societal switch away from fossil fuels. Greater adoption of electric trucks, vehicle, bicycles, boats, aerial vehicles, and other vehicles powered by platform-mounted batteries are seen as critical to this electrification. Such platforms typically comprise one or more electric motors connected directly to a driveshaft for driving wheels, propellors, blades, and other rotary devices to achieve propulsion. Unlike combustion-based engines, electric motors can usually provide such propulsion in the desired speed and torque range without the need for a gearbox, or transmission. Since the addition of a transmission generally tends to increase cost, weight, size, servicing requirements, and reduce reliability, their omission is seen as advantageous. Despite such advantages, a major challenge facing such electrified transport is their limited range and output torque.

A variety of transmission types have been adopted for use in combustion-based engines. A popular type of transmission, particularly in automatic transmissions, is based on planetary gearsets (or epicyclic gearing). A planetary gearset comprises a central sun gear rotating about an axis, a ring gear coaxially coupled to the sun gear for rotation about the same axis (e.g. by concentrically surrounding the sun gear), and at least one planetary gear. The planetary gear has teeth that are engaged to both the sun gear and the ring gear for rotation about the aforementioned axis between the sun gear and ring gear by rotation about its own axis. The planetary gear is held between the sun gear and ring gear by means of a carrier, which is a component that rotates around the aforementioned axis along with the planetary gear. The kinematic relationship between these components is fixed. For example, in certain cases, the kinematic relationship may be exemplified by the following two equations:

$$N_s \omega_s + N_p \omega_p - (N_s + N_p) \omega_c = 0$$
$$N_r \omega_r - N_p \omega_p - (N_r - N_p) \omega_c = 0$$

where $\omega_r$, $\omega_s$, $\omega_p$, $\omega_c$ are the angular velocities of the ring gear, sun gear, planetary gear(s), and carrier respectively, and $N_r$, $N_s$, $N_p$ are the number of teeth of the ring gear, the sun gear, and (each) planetary gear(s), respectively. In this example, the number of teeth of the gears is fixed and known but the four angular velocities are indeterminate based on the above two equations. However, the above two equations can be used to determine all of the angular velocities once the angular velocities of any two of the ring gear, sun gear, planetary gear(s), and carrier are specified. If only one angular velocity is specified, additional equations representing the dynamics (and including the torque) may be used to determine the remaining angular velocity. In their typical use in transmissions, one of the above components is driven by the motor at a predetermined angular velocity and/or torque and one of the components is held fixed so that it does not rotate, e.g. the carrier.

While the integration of transmissions in electric vehicles can potentially increase the range and torque output of such vehicles, the disadvantages mentioned above have hampered their deployment in such applications. Improvement is desired.

SUMMARY

It is found that compact, lightweight, and easy to manufacture transmissions, particularly suitable for electric vehicles, may be achieved by a planetary gearset-based transmission that comprises a sun shaft for coupling to a vehicle motor, a carrier for coupling to a drive shaft of the electric vehicle, and wherein gear ratios are selected by actuation of pairs of pawls that engage with ring gears of the planetary gearset. While the range of gear ratios possible with such a configuration may be limited, it is found to be particularly advantageous for motorcycles and electric vehicles. For example, due to the broad torque range of electric motors, a smaller range of gear ratios may be acceptable for electric vehicles.

In some aspects, there is described a transmission configured to receive an input so as to supply an output via an input-output path. The transmission also includes a sun shaft defining a plurality of sun gears integrally coupled to each other for common rotation around an axis; a plurality of planetary gears engaged with the plurality of sun gears; a carrier supporting the plurality of planetary gears so as to rotate around the axis in common with the plurality of planetary gears; a plurality of bi-directional ratchets defining a plurality of ring gears, each of the plurality of bi-directional ratchets including a corresponding ring gear of the plurality of ring gears coupled to a corresponding sun gear of the plurality of sun gears via a corresponding planetary gear of the plurality of planetary gears for rotation around the axis, the corresponding ring gear defining a corresponding plurality of tooth surfaces distributed around the axis for ratcheting, and a corresponding plurality of opposing tooth surfaces distributed around the axis for ratcheting. The transmission also includes a corresponding pawl configured to be actuatable to engage with the corresponding plurality of tooth surfaces to allow ratcheting rotation of the corresponding ring gear in a first angular direction while preventing rotation of the corresponding ring gear in a second angular direction opposite to the first angular direction, a corresponding opposing pawl configured to be actuatable to engage with the corresponding plurality of opposing tooth surfaces to allow ratcheting rotation of the corresponding ring gear in the second angular direction while preventing rotation of the corresponding ring gear in the first angular direction. The transmission also includes an actuator coupled to the plurality of bi-directional ratchets to actuate the plurality of bi-directional ratchets to change a gear ratio between the input and the output by causing a pawl of the plurality of bi-directional ratchets and an opposing pawl of the plurality of bi-directional ratchets to hold stationary a ring gear of the bi-directional ratchets while allowing ring gears of the bi-directional ratchets other than the ring gear to rotate without ratcheting so as to establish the input-output path between the carrier and a sun gear of the sun shaft coupled to the ring gear.

In some aspects, there is described a ring gear for a planetary gearset that defines a sun gear coupled coaxially, via at least one planetary gear supported by a carrier, to the ring gear for rotation around an axis, the planetary gearset configured to receive an input to supply an output in response to arresting of rotation of the ring gear around the axis. The ring gear also includes a plurality of tooth surfaces distributed around the axis to, while a pawl is engaged with the plurality of tooth surfaces to permit ratcheting of the pawl on the ring gear in a first angular direction, arrest rotation of the ring gear in a second angular direction by the pawl, the first and second angular directions being opposite to each other and lateral to the axis; and a plurality of opposing tooth surfaces distributed around the axis to, while an opposing pawl is engaged with the plurality of opposing tooth surfaces to permit ratcheting of the opposing pawl on the ring gear in the second angular direction, arrest rotation of the ring gear in the first angular direction by the opposing pawl.

In some aspects, there is described a method of operating a transmission defining a sun gear that is coupled coaxially, via at least one planetary gear supported by a carrier, to a ring gear for rotation around an axis, the transmission configured to receive an input to supply an output in response to arresting of rotation of the ring gear around the axis. The method also includes engaging a pawl with a plurality of tooth surfaces of the ring gear distributed around the axis to not obstruct, by the pawl, ratcheting of the pawl on the ring gear in a first angular direction and to prevent rotation of the ring gear in a second angular direction by the pawl, the first and second angular directions being opposite to each other and lateral to the axis; and engaging an opposing pawl with a plurality of opposing tooth surfaces of the ring gear distributed around the axis to not obstruct, by the opposing pawl, ratcheting of the opposing pawl on the ring gear in the second angular direction and to prevent rotation of the ring gear in the first angular direction by the opposing pawl. Other embodiments of this aspect include corresponding computer systems, apparatus, and computer programs recorded on one or more computer storage devices, each configured to cause performance the actions of the methods.

In some aspects, there is described a system, comprising: a motor; a drive shaft; and a transmission mechanically coupled to the motor to be driven by the motor, including: a sun shaft drivably coupled to the motor to receive input from the motor, the sun shaft defining a plurality of sun gears integrally coupled to each other for common rotation around an axis; a plurality of planetary gears engaged with the plurality of sun gears; a carrier supporting the plurality of planetary gears so as to rotate around the axis in common with the plurality of planetary gears, the carrier drivably coupled to the drive shaft to supply output from the transmission to the drive shaft via an input-output path; a plurality of bi-directional ratchets, each of the plurality of bi-directional ratchets including a corresponding ring gear coupled to a corresponding sun gear of the plurality of sun gears via a corresponding planetary gear of the plurality of planetary gears for rotation around the axis, the corresponding ring gear defining a corresponding plurality of tooth surfaces distributed around the axis for ratcheting, and a corresponding plurality of opposing tooth surfaces distributed around the axis for ratcheting, a corresponding pawl configured to be actuatable to engage with the corresponding plurality of tooth surfaces to allow ratcheting rotation of the corresponding ring gear in a first angular direction while preventing rotation of the corresponding ring gear in a second angular direction opposite to the first angular direction, a corresponding opposing pawl configured to be actuatable to engage with the corresponding plurality of opposing tooth surfaces to allow ratcheting rotation of the corresponding ring gear in the second angular direction while preventing rotation of the first ring gear in the first angular direction; and an actuator coupled to the plurality of bi-directional ratchets to actuate the plurality of bi-directional ratchets to change a gear ratio between the input and the output by causing a pawl of the plurality of bi-directional ratchets and an opposing pawl of the plurality of bi-directional ratchets to hold stationary a ring gear of the bi-directional ratchets while allowing ring gears of the bi-directional ratchets other than the ring gear to rotate without ratcheting so as to establish the input-output path between the carrier and a sun gear of the sun shaft coupled to the ring gear.

In some aspects, the ring gear defines a tooth surface and an opposing tooth surface spaced apart from, axially co-located with, and facing the tooth surface.

In some aspects, the ring gear further comprises a protrusion extending radially in-between the tooth surface and the opposing tooth surface to support the pawl, the protrusion tapering to a radially-inner end adjacent to the tooth surface and an opposing radially-inner end adjacent to the opposing tooth surface.

In some aspects, the system further comprises a selector, including a plurality of cams drivably coupled to the actuator, a cam of the plurality of cams being positioned to cause a first end of the pawl to follow the cam to selectively draw a second end of the pawl on to the ring gear of the plurality of bi-directional ratchets by rotational driving of the cam by the actuator.

In some aspects, the actuator is a motor, the selector is a first selector and the plurality of cams are a first plurality of cams, the first selector further comprising a first gear coupled for common rotation with the first plurality of cams, the transmission further comprising: a second selector, including a second plurality of cams drivably coupled to the actuator, a second cam of the second plurality of cams being positioned to cause a first end of the opposing pawl to follow the second cam to selectively draw a second end of the opposing pawl on to the ring gear by rotational driving of the second cam by the actuator, and a second gear coupled for common rotation with the second plurality of cams; and a third gear drivably coupled to the motor and disposed between the first and second gears to drivably engage with the first and second gears to change the gear ratio.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 5A is a perspective view of a ring gear of the transmission, in accordance with an embodiment;

FIG. 5B is a front elevation view of the ring gear;

FIG. 5C is an enlarged view of the region 5C of the ring gear shown in FIG. 5B, in accordance with an embodiment;

FIG. 7A is a perspective view of a carrier of the transmission, in accordance with an embodiment;

FIG. 7B is a side elevation view of the carrier, in accordance with an embodiment;

FIG. 8A is a perspective view of a gear separator of the transmission, in accordance with an embodiment;

FIG. 8B is a side elevation view of the gear separator, in accordance with an embodiment;

FIG. 13A is a view of a cam for actuating a pawl configured to engage with a first ring gear of the transmission, in accordance with an embodiment;

FIG. 13B is a view of a cam for actuating a pawl configured to engage with a second ring gear of the transmission that is associated with a gear of the transmission higher than the gear associated with the ring gear of FIG. 13A, in accordance with an embodiment.

FIG. 13C is a view of a cam for actuating a pawl configured to engage with a third ring gear of the transmission that is associated with a gear of the transmission higher than the gear associated with the ring gear of FIG. 13B, in accordance with an embodiment;

FIG. 13D is a view of a cam for actuating a pawl configured to engage with a fourth ring gear of the transmission that is associated with a gear of the transmission higher than the gear associated with the ring gear of FIG. 13C, in accordance with an embodiment;

FIG. 13E is a view of a cam for actuating a pawl configured to engage with a fifth ring gear of the transmission that is associated with a gear of the transmission higher than the gear associated with the ring gear of FIG. 13D, in accordance with an embodiment;

FIG. 13F is a view of a cam for actuating a pawl configured to engage with a sixth ring gear of the transmission that is associated with a gear of the transmission higher than the gear associated with the ring gear of FIG. 13E, in accordance with an embodiment;

FIG. 13G is a view of a cam for actuating a pawl configured to engage with a seventh ring gear of the transmission that is associated with a gear of the transmission higher than the gear associated with the ring gear of FIG. 13F, in accordance with an embodiment;

DETAILED DESCRIPTION

The following disclosure relates to planetary gearsets for transmissions and ring gears for such transmissions.

Aspects of various embodiments are described in relation to the figures.

Figure 1A:
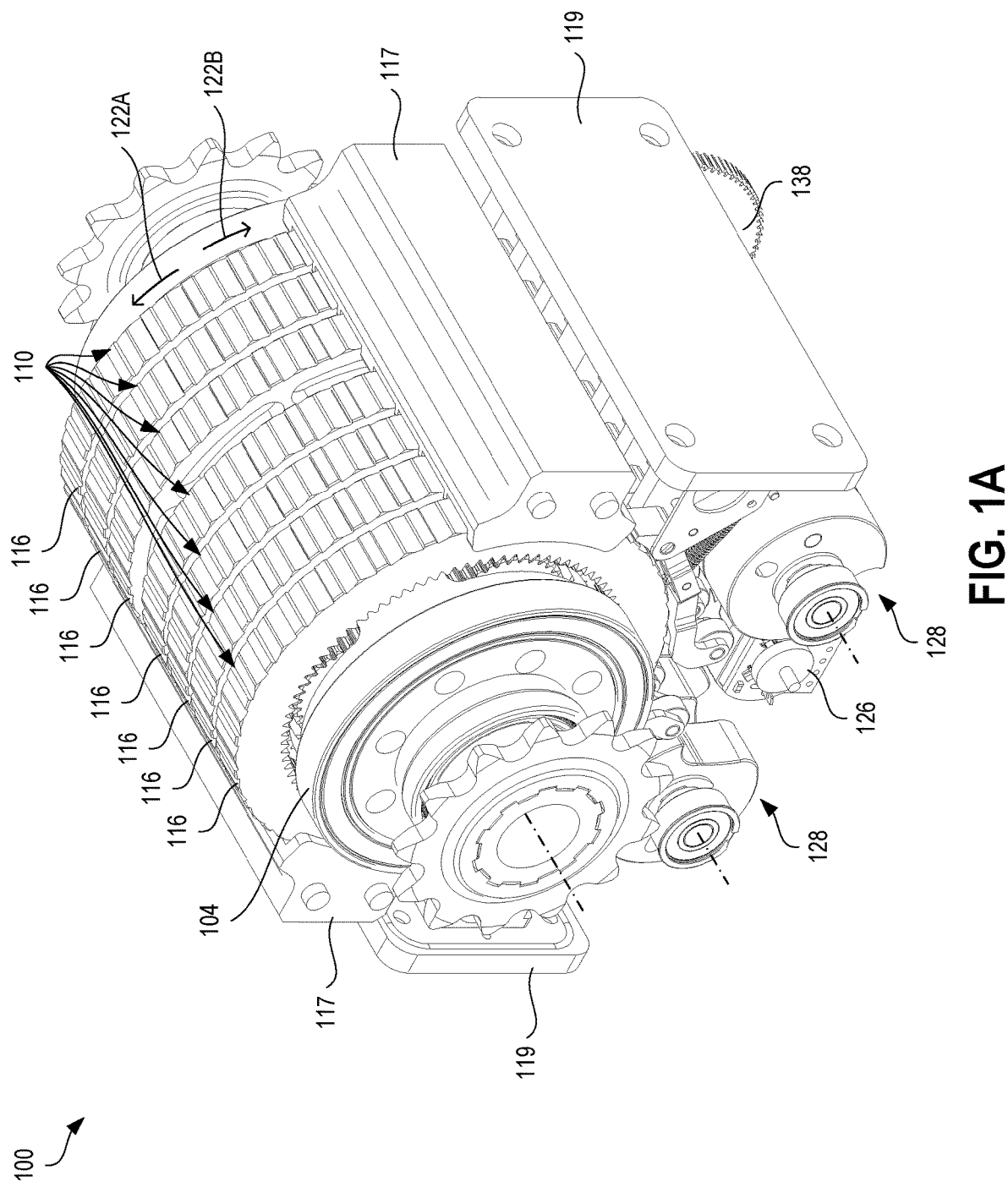
FIG. 1A is a perspective view of a transmission, in accordance with an embodiment.

FIG. 1A is a perspective view of a transmission 100, in accordance with an embodiment.

Figure 1B:
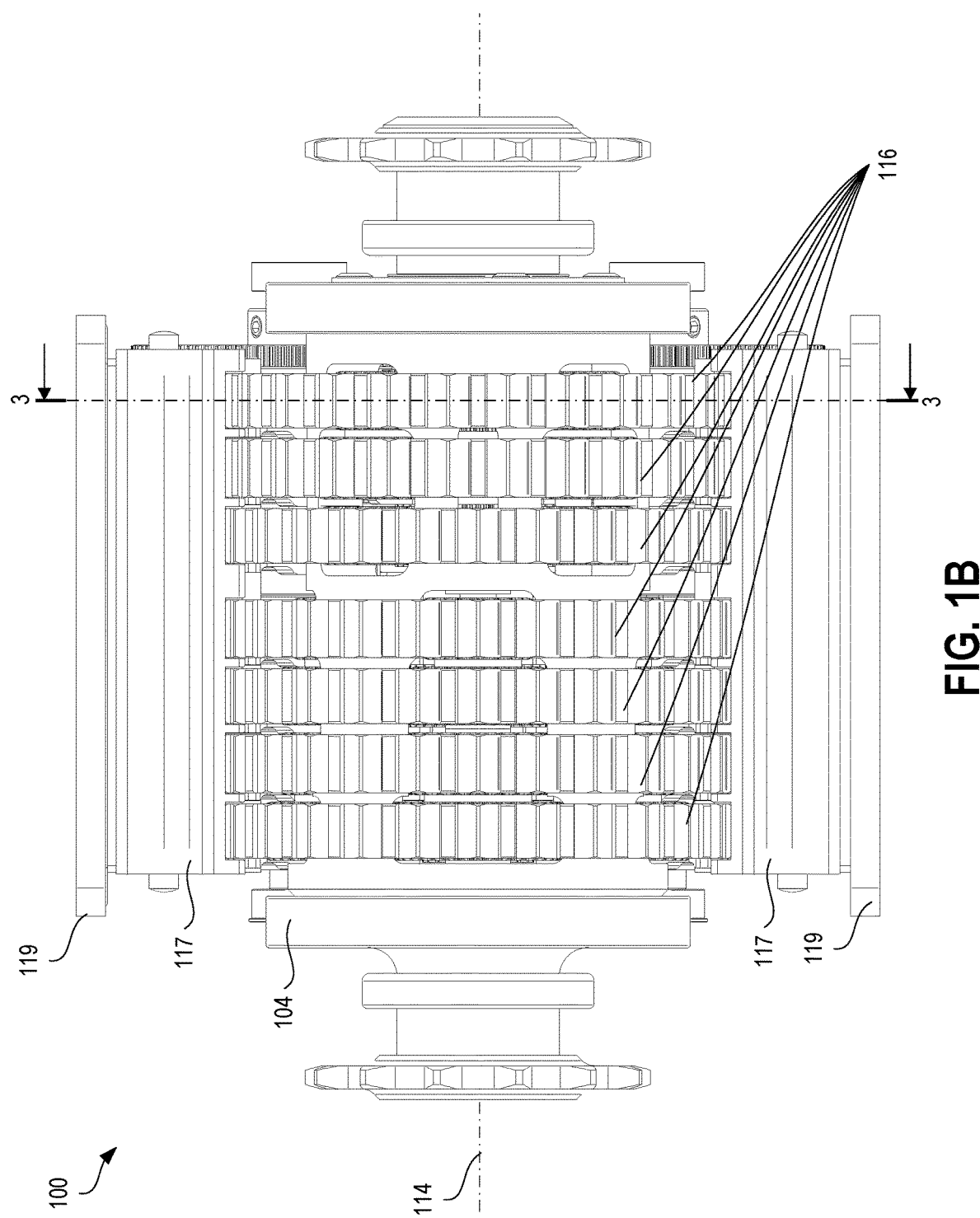
FIG. 1B is a top plan view of the transmission, in accordance with an embodiment.

FIG. 1B is a top plan view of the transmission 100, in accordance with an embodiment.

Figure 1C:
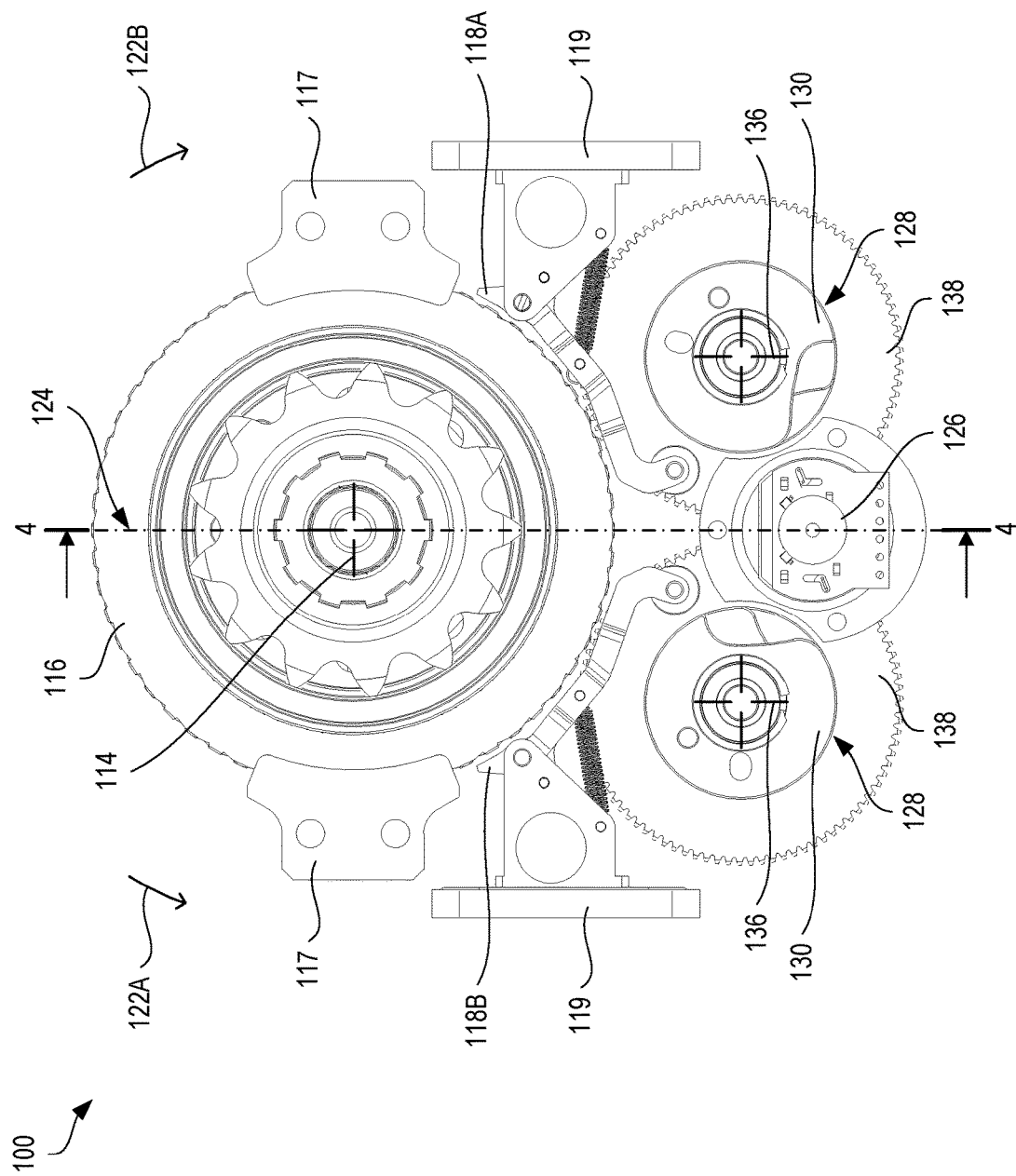
FIG. 1C is a front elevation view of the transmission, in accordance with an embodiment.

FIG. 1C is a front elevation view of the transmission 100, in accordance with an embodiment.

Figure 1D:
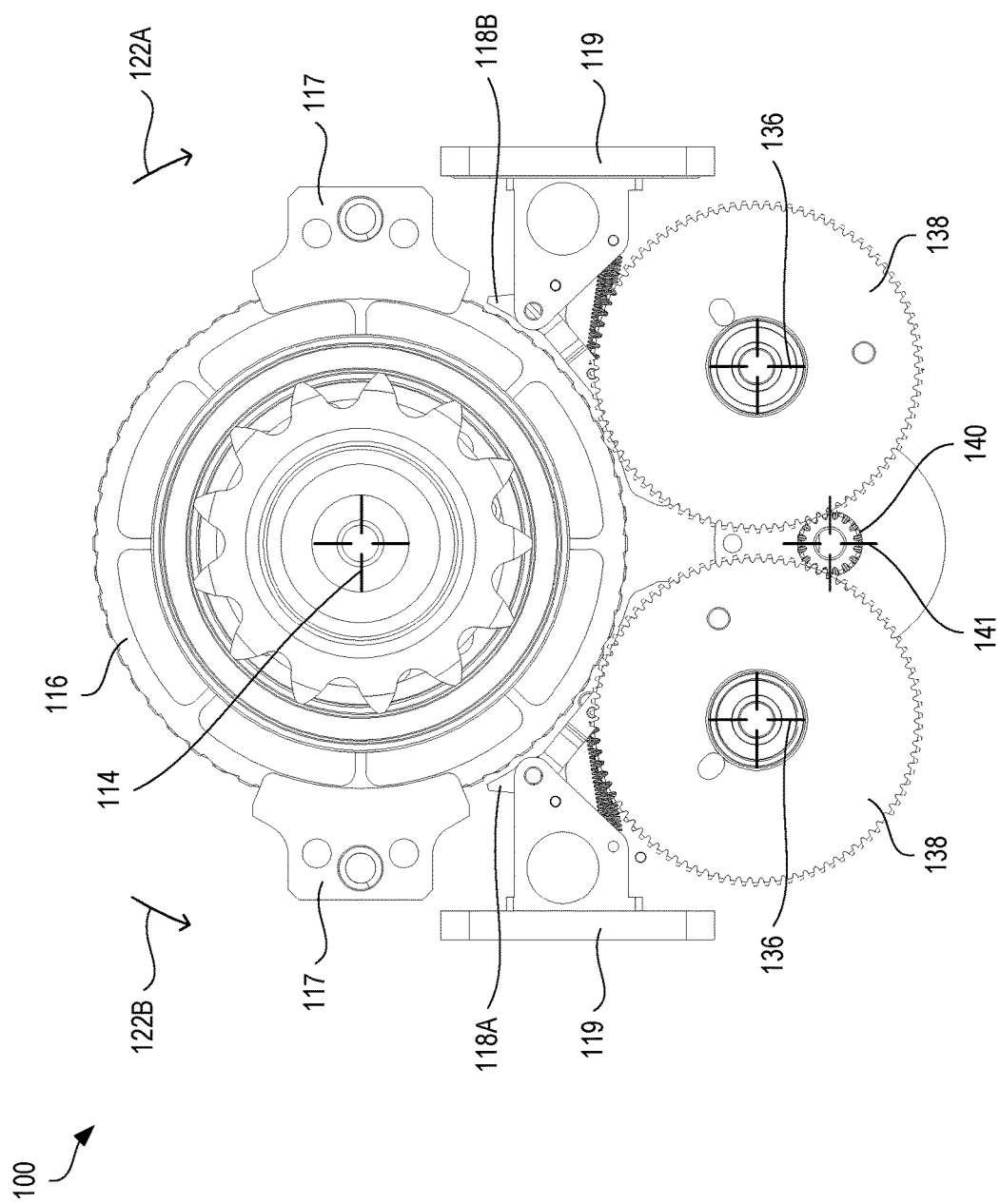
FIG. 1D is a rear elevation view of the transmission, in accordance with an embodiment.

FIG. 1D is a rear elevation view of the transmission 100, in accordance with an embodiment.

Figure 2:
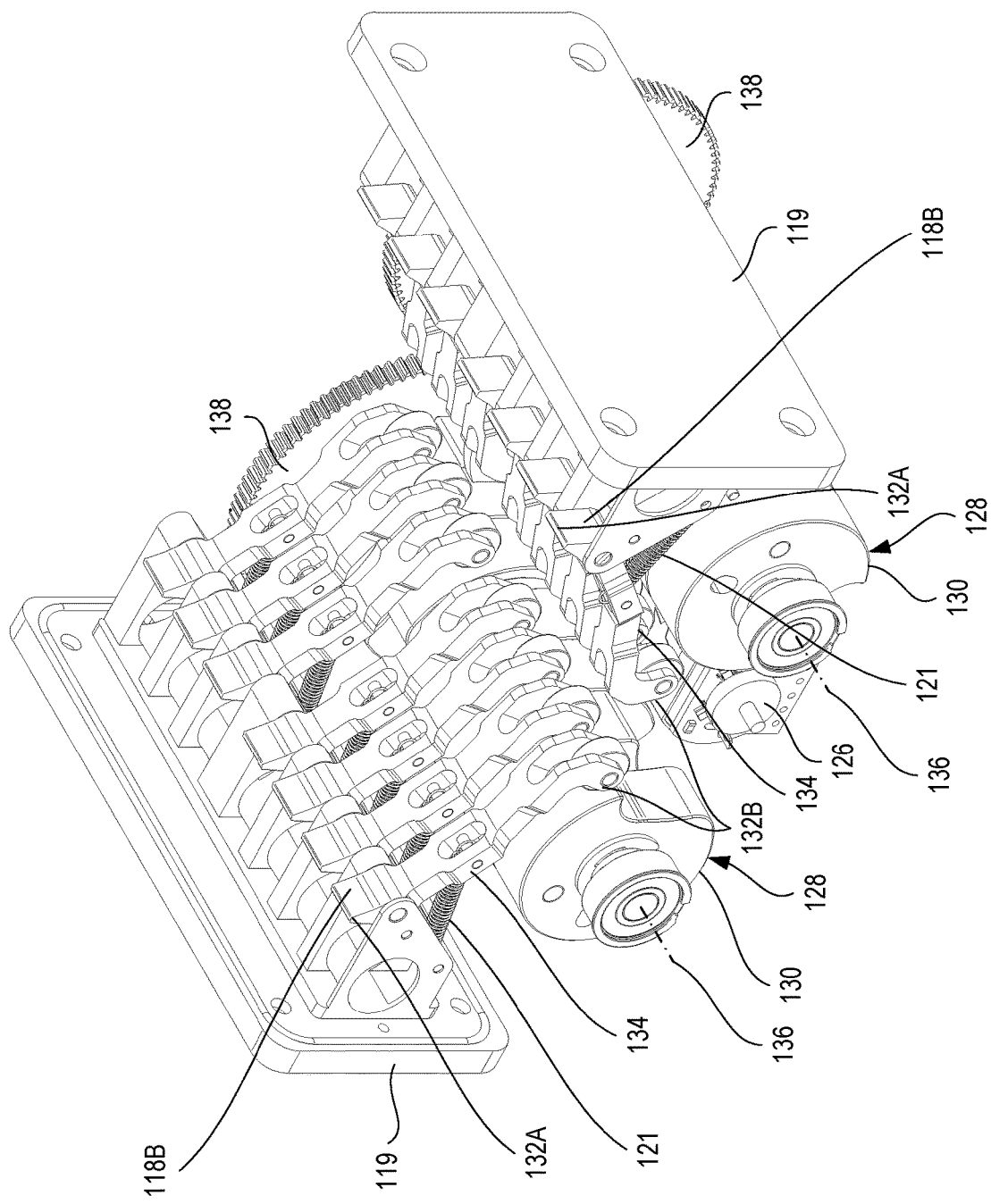
FIG. 2 is a perspective view of a portion of the transmission including pawls and selectors, in accordance with an embodiment.

FIG. 2 is a perspective view of a portion of the transmission 100 including the pawls and selectors, in accordance with an embodiment.

Figure 3:
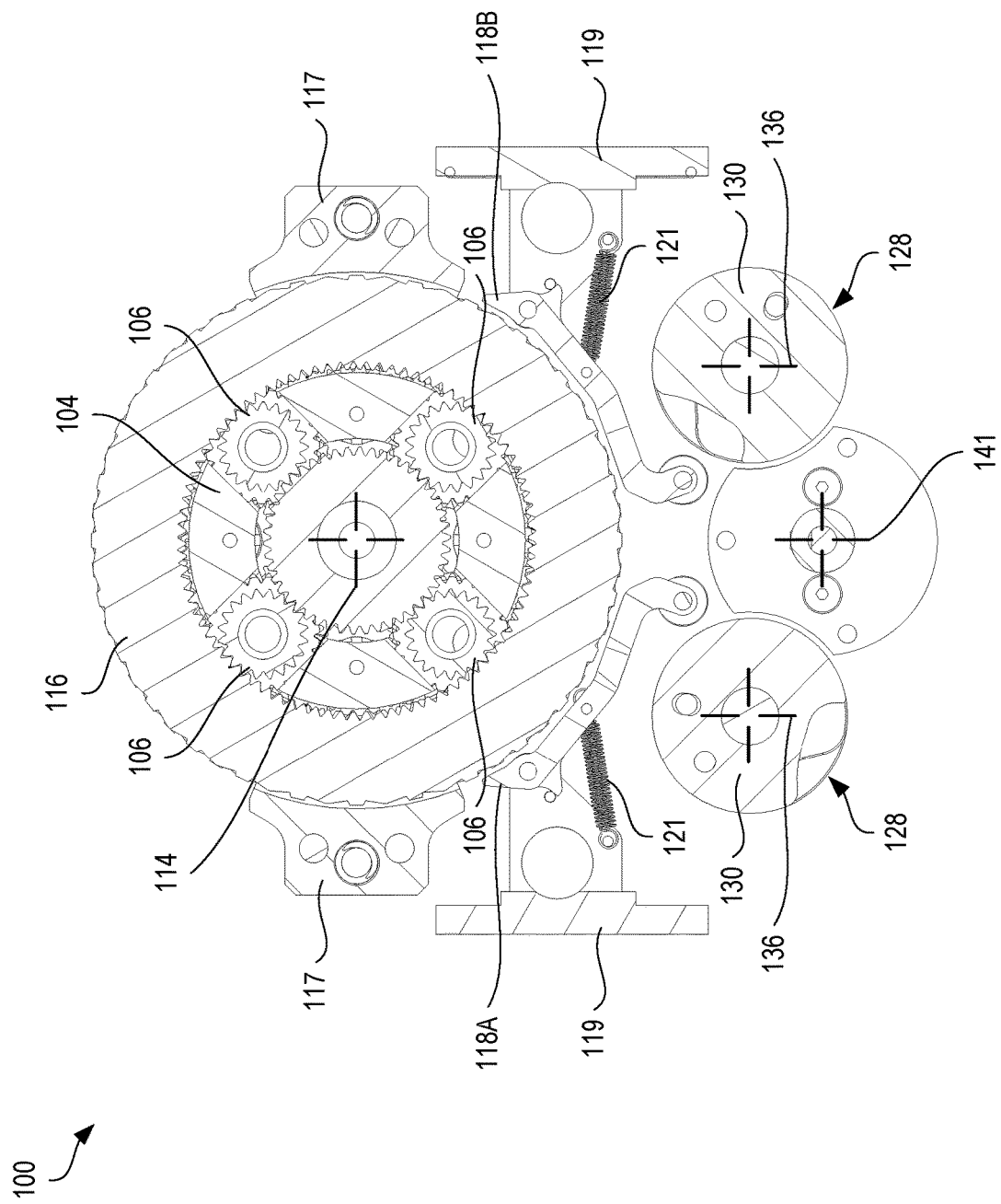
FIG. 3 is a cross-sectional view of the transmission along the line 3-3 shown in FIG. 1B, in accordance with an embodiment.

FIG. 3 is a cross-sectional view of the transmission 100 along the line 3-3 shown in FIG. 1B, in accordance with an embodiment.

Figure 4:
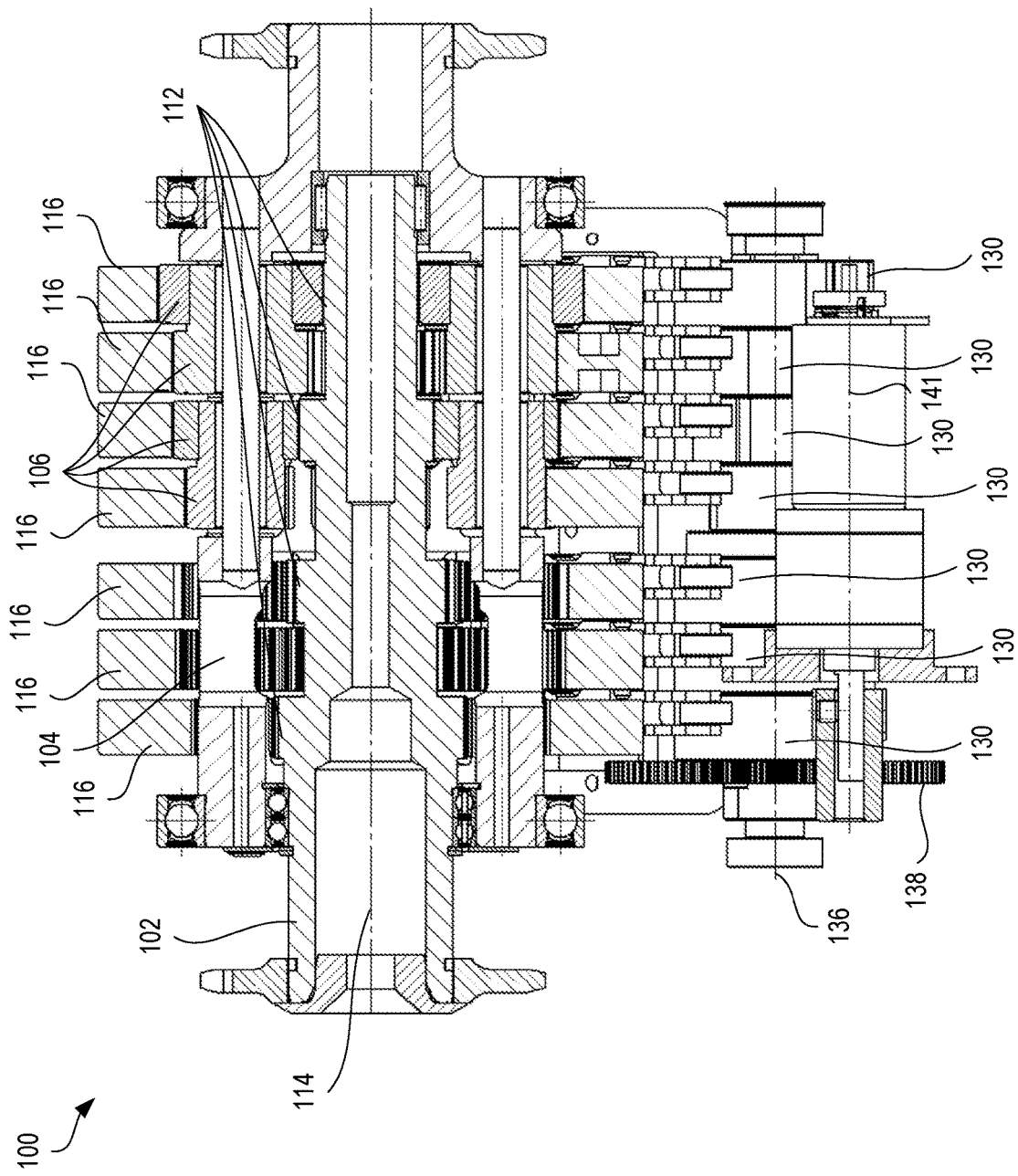
FIG. 4 is a cross-sectional view of the transmission along the line 4-4 shown in FIG. 1C, in accordance with an embodiment.

FIG. 4 is a cross-sectional view of the transmission 100 along the line 4-4 shown in FIG. 1C, in accordance with an embodiment.

The transmission 100 shown in FIGS. 1A-1D is a multi-speed transmission. The transmission 100 may receive an input to supply an output via an input-output path. The input and output may refer to shaft power or other rotary power. The input-output path may refer to the mechanical relationship or power pathway between the input and output, e.g. through gearing and other components. As such, the transmission 100 may be configured to selectively change a gear ratio between the input and the output from a low to high gear ratio (as a multiplier) or a high to low gear ratio (as a reducer). In various embodiments, the transmission 100 in FIGS. 1A-1D may be a seven-speed or a four-speed transmission.

As referred to herein, for clarity, different instances and/or embodiments of the same part may be referred to use the same reference numeral, where such usage does not further obscure the subject-matter.

An input-output path (for power) between the input and the output of the transmission 100 may be defined through a planetary gearset that is configurable to achieve a variety of gear ratios between the input and the output. The planetary gearset may comprise a sun shaft 102, a carrier 104, one or more (or a plurality of) planetary gears 106, and a plurality of bi-directional ratchets 110.

The sun shaft 102 may define one or more (or a plurality of) sun gears 112. As will be shown later, the sun gears 112 may be integrally coupled to each other for common rotation around an axis 114 of the transmission 100.

The planetary gears 106 are engaged with the sun gears 112. Each sun gear 112 may have a corresponding subset of the planetary gears 106 whose teeth are meshed therewith for toothed engagement therewith so as to allow rotation of the subset of planetary gears 106 around the axis 114 by their rolling generally around a toothed edge (e.g. outer circumference) of the corresponding sun gear 112. In addition, the planetary gears 106 may rotate around their own planetary axes.

The carrier 104 supports the planetary gears 106 in-place. As such, when the planetary gears 106 rotated around the axis 114, the carrier 104 itself rotates around the axis 114 in common with the planetary gears 106.

Each of the bi-directional ratchets 110 defines a corresponding ring gear 116, such that the plurality of bi-directional ratchets 110 define a plurality of ring gears 116. Each of the ring gears 116 is coupled to a corresponding one of the sun gears 112 via a corresponding at least one of the planetary gears 106 for rotation around the axis 114.

In various embodiments, each of the ring gear 116 may be substantially identically. In some embodiments, the inner radii of the ring gears 116 may be substantially identical. In some embodiments, the outer radii of the ring gears 116 may be substantially identical. Furthermore, the planetary gears 106 associated with different ring gears 116 (and corresponding sun gears 112) may be substantially identical. In some embodiments, the inner radii of the planetary gears 106 associated with different ring gears 116 may be substantially identical. In some embodiments, the outer radii of the planetary gears 106 associated with different ring gears 116 may be substantially identical. However, as will be shown later, the sun gears 112 of the sun shaft 102 may have varying outer radii. As such, a single rotation of a ring gear 116 may cause a specific rotation of the sun shaft 102 based on the sun gear 112 of the sun shaft 102 that is engaged with the ring gear 116. Such a rotation of the sun shaft 102 may result in varying rotations of the other ring gears 116, depending on the respective sun gears 112. Since the carrier 104 must support the planetary gears 106, holding a ring gear 116 stationary causes the establishment of a specific gear ratio between the sun shaft 102 and the carrier 104.

The ring gears 116 may be retained in-place via a gear separator 117. The gear separator 117 may mitigate axial movement (along the axis 114) of the ring gears 116. For example, the gear separators 117 may prevent ring gears 116 from colliding with each other and/or axially moving out of engagement with the planetary gears 106. Additionally, the gear separator 117 may prevent radially outward movement of the ring gears 116.

Each of the bi-directional ratchets 110 (or each of the ring gears 116) corresponds to a particular gear ratio between the input and the output of the transmission 100.

The ring gear 116 may be engaged with planetary gears 106 via toothed engagement. The ring gear 116 may be generally annular or ring-shaped. In various embodiments, the ring gear 116 may define gear teeth on an internal edge or internal circumference thereof for suitable complementary engagement with gear teeth of (one or more of) the planetary gears 106. For example, such gear teeth may extend radially from an internal circumference of the ring gear 116.

Each ring gear 116 further comprises ratchet teeth that allow ratcheting thereon by pawls, as will be described later. The ratchet teeth may be configured to allow bi-directional ratcheting (i.e. ratcheting in both angular directions), e.g. depending on the orientation and/or configuration of pawls, the direction of ratcheting may be changed.

Each bi-directional ratchet 110 further comprises a corresponding pawl 118A and an opposing pawl 118B adapted for ratcheting engagement with a corresponding ring gear 116. The pawl 118A and the opposing pawl 118B are opposite to each other. The pawl 118A may be spaced apart from and disposed on a first side of a plane 124 passing through the axis 114, while the opposing pawl 118B may be spaced apart from and disposed on a second side of the plane 124 opposite the first side.

The pawl 118A is engageable with a ring gear 116 so as to allow (or at least not obstruct) ratcheting of the pawl 118A on the ring gear 116 in a first angular direction 122A, while preventing rotation in a second angular direction 122B. The first and second angular directions 122A, 122B are opposite to each other and lateral to the axis 114. The ring gear 116 may undergo ratcheting rotation in the first angular direction 122A.

Similarly, the opposing pawl 118B is engageable with the ring gear 116 so as to allow (or at least not obstruct) ratcheting of the opposing pawl 118B on the ring gear 116 in the second angular direction 122B, while preventing rotation in the first angular direction 122A. The ring gear 116 may undergo ratcheting rotation in the second angular direction 122B. As referred to herein, ratcheting of a pawl on a toothed wheel refers to rotation of the toothed wheel while the pawl is laid upon the toothed wheel in a ratcheting manner, in which rotation of the toothed wheel is not prevented. For example, ratcheting of a pawl on the toothed wheel in a particular direction involves rotation of the toothed wheel in that direction.

In various embodiments, each of the pawls 118A, 118B of a ring a gear 116 may be substantially identically in construction. However, the position and orientation of the pawls 118A, 118B within the transmission 100 may determine their function when engaged with the ring gear 116. The pawls 118A, 118B are oriented so that their ends face each other around the ring gear 116 to facilitate engagement with opposite tooth surfaces of the ring gear 116.

The pawls 118A, 118B may be mounted on to respective brackets 119 on opposite sides of the transmission 100, relative to the axis 114.

An actuator 126 is coupled to the plurality of bi-directional ratchets 110 so as to allow selective actuation the pawls 118A, 118B. In particular, each of the pawls 118A, 118B is selectively actuatable via the actuator 126 to engage with ratchet teeth on a corresponding ring gear 116. Actuation of one of the pawls (the pawl 118A or 118B) causes it to prevent rotation of the corresponding ring gear 116 in the second angular direction 122B while actuation of a corresponding opposing pawl 118B causes it to prevent rotation of the corresponding ring gear 116 in the first angular direction 122A. As such, each of the ring gears 116 may be selectively held stationary (due to simultaneous engagement of the pawls 118A, 118B with the ring gear 116) while allowing the remaining ring gears 116 of the bi-directional ratchets 110 to rotate without ratcheting.

In various embodiments, the actuator 126 may be a motor, such as an electrical motor or an internal combustion engine motor. The actuator 126 may be controllable to achieve desired actuation of the bi-directional ratchets 110.

Holding a particular ring gear 116 stationary establishes an input-output path between the carrier 104 and a sun gear 112 of the sun shaft 102 coupled to that ring gear 116, as long as the remaining ring gears 116 are allowed to freely rotate and are not held stationary. Thus, selection of a particular ring gear 116 may allow selection or changing of a gear ratio between the input and the output.

The pawls 118A may be coupled to the actuator 126 via a selector 128. The opposing pawls 118B may also be coupled to the actuator 126 via another selector 128. Each selector 128 may include a corresponding plurality of cams 130. Each selector 128 may have a corresponding plurality of cams 130 that are coupled for common rotation around a corresponding selector axis 136 and that may be (rotatably) drivably coupled to the actuator 126.

Each of the pawls 118A, 118B may define an (near) end 132A suitable for engagement with the ring gear 116 and an (far) end 132B. The end 132B may be opposite to the end 132A relative to an intermediate portion 134 positioned between the ends 132A, 132B.

In various embodiments, the ends 132A of the respective pawls 118A, 118B may be revolutely joined to the bracket 119, e.g. each of the pawls 118A, 118B may have a corresponding pin going through an end 132A thereof and the bracket 119 to allow hinged rotation of the end 132A about the bracket. In some embodiments, the end 132A may be relatively unconstrained to the bracket 119.

In various embodiments, the intermediate portions 134 of the respective pawls 118A, 118B may be resiliently coupled to the bracket, e.g. via springs 121. Such resilient coupling may allow a spring force to be used to engage the pawls 118A, 118B with the ring gears 116 and/or to disengage therefrom. In various embodiments, the spring constant of such spring may be adapted to ensure sufficient force is applied for achieving such objectives.

The positioning of the near end 132A may be varied by varying the positioning of the far end 132B so as to effect engagement or disengagement of a corresponding pawl with its ring gear 116. For example, pushing the far end 132B upwards may draw the near end 132A downwards, and vice versa.

Each of the cams 130 may be positioned to cause the far end 132B of a corresponding pawl of the pawls 118A, 118B to follow the cam 130. This may allow selective drawing of the near end 132A of the corresponding pawl of the pawls 118A, 118B on to the ring gear 116 by rotational driving of the cam 130 by the actuator 126. As will be shown later, notches and similar features defining the cam profiles may alter positioning of the far end 132B and hence effect the engagement of the corresponding pawl of the pawls 118A, 118B with the ring gear 116 via the near end 132A.

Each selector 128 may comprise a respective selector gear 138 that is coupled to the corresponding plurality of cams 130 for common rotation therewith. As such two selector gears 138 may be provided for the two selectors 128. When the actuator 126 is a rotary actuator such as a motor, the two selector gears 138 may be commonly driven by a common gear 140 gear drivably coupled to the actuator 126 for rotation around an actuator axis 141. The common gear 140 may be disposed between the selector gears 138 to drivably engage with each of the selector gears 138 to allow actuation of the pawls 118A, 118B via the cams 130 to change the gear ratio between the input and the output of the transmission 100.

As illustrated in FIG. 4, the embodiment of the transmission 100 shown in FIGS. 1A-1D, 2-4 has a sun shaft 102 with no more than four separate sun gears 112. As such, four of the ring gears 116 of the transmission 100 may be operative to change gears. In some embodiments, each of all of the ring gears 116 is coupled to a corresponding sun gear 112. In some embodiments, more than one ring gear may be coupled to the same sun gear 112. For example, in some embodiments, the planetary gears 106 may be stepped, i.e. comprising a plurality of integrally coupled individual gears that rotate together and are each coupled to a corresponding ring gear 116, and one of the individual gears thereof may be coupled to a single sun gear 112 to cause the plurality of integrally coupled individual gears to rate due to that single sun gear 112.

In some embodiments, the ring gears 116 may have dissimilar internal diameters (internal pitch circle diameters), which diameters are associated with gearing teeth for engaging with the planetary gears 106. In some embodiments, the ring gears 116 may have similar outer diameters. This may be advantageous as it may simplify construction of the ring gears 116 and may allow smaller, and lighter construction. In such embodiments, variation in the gear ratio between input and output of the transmission 100 may be achieved by varying gearing diameters (e.g. pitch circle diameters) of the sun gears 112, e.g. by varying outer diameters of the sun gears 112.

In some embodiments, the ring gears 116 may be of identical internal diameter (internal pitch circle diameter), which diameter is associated with gearing teeth for engaging with the planetary gears 106. This may be advantageous for manufacturing.

In embodiments wherein the sun gears 112 have similar gearing diameters, various gear ratios between the input and the output may be achieved by dissimilar internal diameters of the ring gears 116 relative to each other.

In some embodiments, particularly where the range of gear ratios required is large, the outer diameters of the ring gears 116 may be dissimilar. This may lead to undesirable centrifugal stresses on certain ring gears 116. Additionally, the overall size, weight, and manufacturing cost of the transmission 100 may increase. Such disadvantages much be potentially mitigated by achieving a desired gear ratio by varying the gearing diameters of the sun gears 112 instead of the internal pitch circle diameters of ring gears 116. For example, substantially identical ring gears 116 may be used.

It is understood that the gearing diameters of the planetary gears 106 are adapted to connect the ring gears 116 to the sun gears 112.

Certain reference numbers and/or lead lines in certain drawings of FIGS. 1A-1D, 2-4 have been omitted for clarity where it was deemed that inclusion of such reference numbers and/or lead line would lead to greater obscurity of the subject-matter, e.g. in FIG. 2, only a single pair of pawls 118A, 118B (and their attended subparts) have been annotated with reference numbers and/or lead lines.

The assembly shown in FIGS. 1A-1D, 2-4 may be adapted for use in various applications. The assembly is schematically illustrated, and it is understood that a skilled person may engage in various modifications and/or additions in implementing the transmission 100.

FIG. 5A is a perspective view of the ring gear 116, in accordance with an embodiment.

FIG. 5B is a front elevation view of the ring gear 116.

FIG. 5C is an enlarged view of the region 5C of the ring gear 116 shown in FIG. 5B, in accordance with an embodiment.

As shown in FIGS. 5A-5C, the ring gear 116 defines a plurality of tooth surfaces 142A and a plurality of opposing tooth surfaces 142B distributed around the axis 114 that are suitable for ratcheting.

The plurality of tooth surfaces 142A, 142B may be disposed circumferentially around an outer end 144 (a radially outer end) of the ring gear 116. Each of the plurality of tooth surfaces 142A may be disposed in-between two of the plurality of opposing tooth surfaces 142B. Similarly, each of the plurality of opposing tooth surfaces 142B may be disposed in-between two of the plurality of tooth surfaces 142A. In various embodiments, each opposing tooth surface 142B may be spaced apart from, and facing, an opposing tooth surface 142A.

Opposite surfaces, along a circumferential direction, of a common tooth 146 may define a tooth surface 142A and an opposing tooth surface 142B. In various embodiments, the common tooth 146 may be symmetric about a radial plane, i.e. a plane extending radially parallel to the axis 114. For example, the outer end 144 may comprise a plurality of such teeth 146.

In some embodiments, the plurality of tooth surfaces 142A, 142B may be axially co-located. Advantageously, this may reduce weight, and size of the ring gear 116. However, it is appreciated that, in some embodiments, the plurality of tooth surfaces 142A, 142B may not be axially coincident, e.g. the plurality of tooth surface 142A may be axially staggered relative to the plurality of opposing surfaces 142B.

The tooth surfaces 142A, 142B are configured to engage with respective pawls 118A, 118B. The tooth surfaces 142A are configured to arrest rotation of the ring gear 116 in the second angular direction 122B by engagement with the pawl 118A, while permitting ratcheting of the pawl 118A on the ring gear 116 in the first angular direction 122A. Similarly, the opposing tooth surfaces 142B are configured to arrest rotation of the ring gear 116 in the first angular direction 122A by engagement with the opposing pawl 118B, while permitting ratcheting of the opposing pawl 118B on the ring gear 116 in the second angular direction 122B. In various the plurality of tooth surfaces 142A, 142B (or one or more of the common teeth 146) may be in unitary construction and/or in unitary construction with the ring gear 116.

It is understood that, while the pawls 118A, 118B may be configured to allow ratcheting thereof on the ring gear 116 in particular angular directions, such ratcheting may be prevented, e.g. if both pawls 118A, 118B are simultaneously engaged with the ring gear 116.

A plurality of protrusions 148 are provided on the ring gear 116 for supporting the pawls 118A, 118B during ratcheting. The plurality of protrusions 148 may be axially co-located with the plurality of tooth surfaces 142A (and/or the plurality of opposing tooth surfaces 142B).

Each protrusion 148 may extend radially in-between a corresponding tooth surface 142A and a corresponding opposing tooth surface 142B. Each protrusion 148 may taper to a corresponding radially-inner end 150A adjacent to the tooth surface 148A and an opposing radially-inner end 150B adjacent to the opposing tooth surface 148B. In various embodiments, each protrusion 148 may taper linearly from a corresponding (singular) radially-outer end 152 to the corresponding radially-inner ends 150A, 150B. In various embodiments, the radially-outer end 152 may be substantially flat and/or tangent to a circle defined around the collection of radially-outer ends 152. Each of the pawls 118A, 118B may periodically rest on the radially-outer ends 152 as they ratchet on the ring gear 116 so as to mitigate impact on the ring gear 116. For example, smoother operation of the bi-directional ratchets 110 and lower acoustic noise associated therewith may be achieved.

The plurality of protrusions 148 may ensure that the pawls 118A, 118B do not knock against the ring gear 116 in-between adjacent ones of the common teeth 146.

Figure 6A:
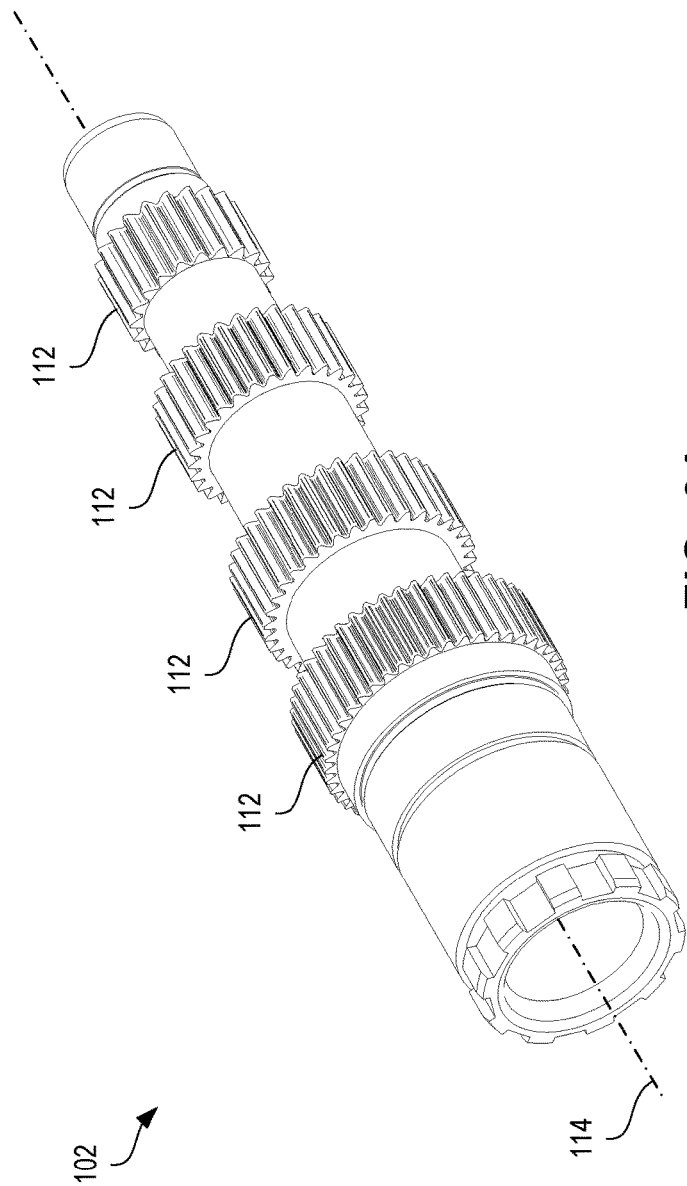
FIG. 6A is a perspective view of a sun shaft of the transmission, in accordance with an embodiment.

FIG. 6A is a perspective view of the sun shaft 102, in accordance with an embodiment.

Figure 6B:
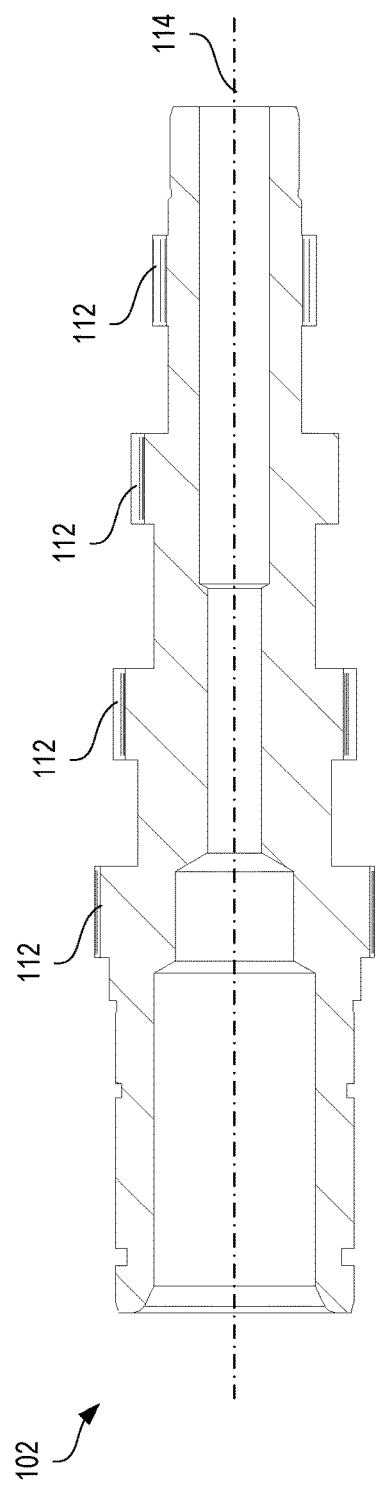
FIG. 6B is a cross-sectional view of the sun shaft, in accordance with an embodiment.

FIG. 6B is a cross-sectional view of the sun shaft 102, in accordance with an embodiment.

The sun shaft 102 is elongated along the axis 114. The plurality of sun gears 112 are axially distributed along the sun shaft 102. The plurality of sun gears 112 may be integrally coupled to each other for common rotation around the axis 114. In some embodiments, the plurality of sun gears 112 may be in unitary construction. For example, the sun shaft 102 may be a stepped gear.

In various embodiments, each of the plurality of sun gears 112 may be distinct relative to the remaining plurality of sun gears 112, e.g. each of the plurality of sun gears 112 may define a unique outer radius and/or teeth that engage with corresponding planetary gears 106. The plurality of sun gears 112 may be arranged along the axis 114 in ascending (or, equivalently, descending) size, defined in terms of outer radii of the respective sun gears 112.

Each rotation of the sun shaft 102 results in a corresponding rotation of each of the sun gears 112 and thus the corresponding transmitted torque may vary from sun gear to sun gear.

FIG. 7A is a perspective view of the carrier 104, in accordance with an embodiment.

FIG. 7B is a side elevation view of the carrier 104, in accordance with an embodiment.

The carrier 104 is generally hollow and cylindrically shaped to accommodate the sun shaft 102 and planetary gears 106 therein. The carrier 104 may be elongated along the axis 114, in common with the sun shaft 102. The carrier 104 may comprise a plurality of apertures formed in an outer circumferential surface of the carrier 104 for receiving the planetary gears 106 therein. The planetary gears 106 may protrude from the carrier 104 from the apertures so as to engage with the ring gear(s) 116. A single carrier 104 may support the planetary gears 106 associated with two or more, or all, of the ring gears 116. Rotation of the carrier 104 around the axis 114 is associated with rotation of the planetary gears 106 around the axis 114. It is understood that the planetary gears 106 may additionally rotate around their own respective axes.

The carrier 104 may define an interface 154 for coupling the carrier 104 to an external component, such as a shaft, to allow output of mechanical or shaft energy from the carrier 104. The interface 154 may comprise features, such as radially extending protrusions and/or notches to allow interfacing of the carrier 104 with an external component. The transmission 100 may allow transmitting of shaft energy between the sun shaft 102 (as input or output) and the carrier 104 (as, respectively, output or input) via the interface 154.

FIG. 8A is a perspective view of the gear separator 117, in accordance with an embodiment. The axis 114 is shown notionally in FIG. 8A to illustrate the orientation of the gear separator 117 within the assembly defining the transmission 100.

FIG. 8B is a side elevation view of the separator 117, in accordance with an embodiment.

The gear separator 117 may define a plurality of axially separated spacers 156. The spacers 156 may be arc-shaped.

The spacers 156 may be in substantially rigid construction relative to each other so as to maintain the ring gears 116 axially separated from each other and/or in substantially fixed axially separation relative to each other. The spacers 156 may be integrally coupled to each other.

In the transmission 100, each of the plurality of spacers 156 extends radially in-between a corresponding pair of ring gears 116 to mitigate axial movement of the plurality of ring gears 116.

The gear separator 117 may define axially outer ends 158 that protrude radially inwardly so as to the axial movement of the plurality of ring gears 116 as a whole and, in particular, the axial movement of the axially outermost ring gears 116.

The gear separator 117 may define a radially outer end 160. The radially outer end 160 may be disposed radially outwardly of the plurality of ring gears 116. For example, the radially outer end 160 may serve to cap the ring gears 116 at radial ends thereof.

In various embodiments, the gear separator 117 may be of integrally formed as a unitary gear separator 117. In some embodiments, the gear separator 117 may be of unitary construction, e.g. forged as a single unit or additively manufactured into the same.

In various embodiments, the separation between adjacent spacers 156 may be adapted based on an axial depth of the ring gears 116. In some embodiments, one or more spacers 156 may be axially longer than other spacers 156.

Figures 9A, 9B:
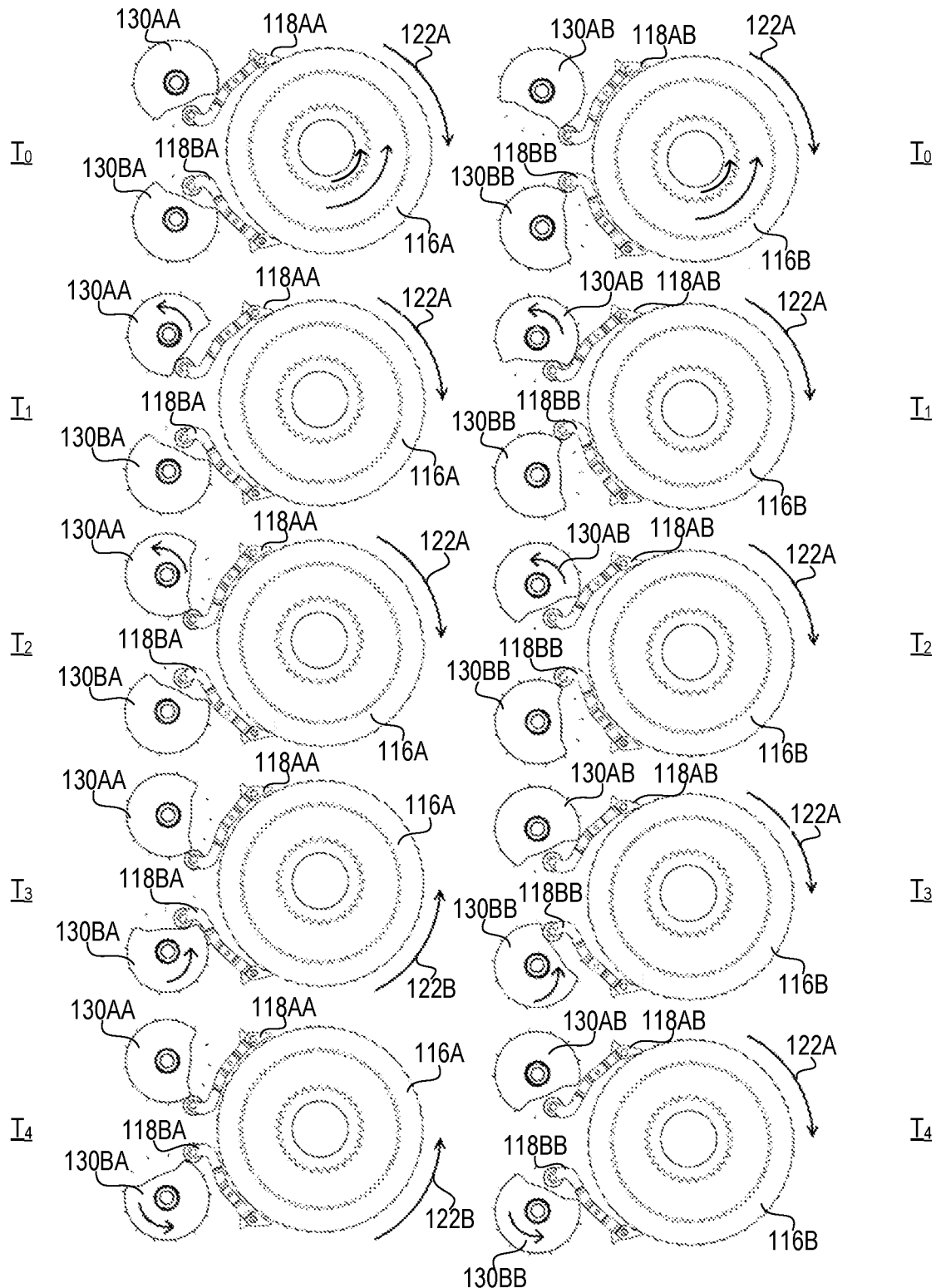
FIG. 9A is a schematic of a low ring gear, arresting of which by oppositely oriented pawls engages a lower gear of the transmission, during upshifting while power is transmitted from the sun shaft to the carrier, in accordance with an embodiment.
FIG. 9B is a schematic of a high ring gear, arresting of which by oppositely oriented pawls engages a higher gear of the transmission, during upshifting while power is transmitted from the sun shaft to the carrier, in accordance with an embodiment.

FIGS. 9A-B are schematic views of various stages of the transmission 100 as a higher gear thereof is engaged (up-shifting) while input shaft work is provided via the sun shaft 102, in accordance with an embodiment.

For example, the transmission 100 may be coupled to a motor of a vehicle that is undergoing acceleration by the motor driving the sun shaft 102, the carrier 104 being coupled to wheels (e.g. via a differential) of the vehicle to rotatably drive the wheels.

FIGS. 9A-9B show five stages of the transmission 100, labelled in temporal sequence $T_0$, $T_1$, $T_2$, $T_3$, $T_4$. It is understood that, in some embodiments, these stages may partially temporally overlap.

FIG. 9A is a schematic of a ring gear 116A (also referred to as low ring gear 116A), arresting of which by oppositely oriented pawls 118AA, 118BA engages a lower gear of the transmission 100. The engagement of the lower gear is achieved by causing a set of planetary gears engaged with the ring gear 116A to, since the ring gear 116A is held stationary, traverse an internal circumference of the ring gear 116A at a speed determined by a sun gear of the sun shaft 102 that is engaged with the aforementioned planetary gears. The rotational directions of the sun shaft, and the carrier are indicated by the radially spaced apart arc-shaped arrows.

FIG. 9B is a schematic of a ring gear 116B (also referred to as high ring gear 116B), engagement (or arresting) of which by oppositely oriented pawls 118AB, 118BB engages a higher gear of the transmission 100. The engagement of the higher gear is achieved by causing a set of planetary gears engaged with the ring gear 116B to, since the ring gear 116B is held stationary, traverse an internal circumference of the ring gear 116B at a speed determined by a sun gear of the sun shaft 102 that is engaged with the aforementioned planetary gears.

In FIGS. 9A-9B, at stage $T_0$, the lower gear of the transmission 100 is engaged. At stage $T_4$, the higher gear of the transmission 100 is engaged. Stages $T_1$, $T_2$, $T_3$ are transitory stages between stages $T_0$ and $T_4$.

The pawls 118AA, 118BA, 118AB, 118BB are actuated via rotation of respective cams 130AA, 130BA, 130AB, 130BB, and in particular, by following of rollers thereof on cam surfaces that define the cam profiles of the cams 130AA, 130BA, 130AB, 130BB. Such rollers are disposed on ends 132B of the pawls 118AA, 118BA, 118AB, 118BB distal from the corresponding ring gears 116.

The cams 130AA, 130AB may be mounted on a first one of the selectors 128. The cams 130BA, 130BB may be mounted on a second one of the selectors 128. A set of cams on a common selector may coupled for common rotation, as presented previously.

In various embodiments, rotation of the cams may be achieved by a single motor configured to supply shaft power to selectors 128 having the cams 130AA, 130BA, 130AB, 130BB mounted thereon to effect rotation of such around corresponding selector axes 136, by two separate motors configured to supply shaft power to each of the selectors 128 individually to effect rotation of such around corresponding selector axes 136, or by a plurality of separate motors, each of which is configured to actuatably rotate a separate unique one of the cams 130AA, 130BA, 130AB, 130BB.

Since the sun gear coupled to the ring gear 116A and the sun gear coupled to the ring gear 116B are integrally coupled to each other via the sun shaft 102 and thus rotate at a common angular rate of rotation.

At stage $T_0$, in FIGS. 9A-9B, the low ring gear 116A is fully engaged by both pawls 118AA, 118BA and is therefore in a stationary position. Each of the pawls 118AA, 118BA, whose ends face each other, is rotated, e.g. about its respective end 132A and/or intermediate portion 134 on to the ring gear 116A. In such a stationary position, the low ring gear 116A pushes against the pawl 118BA in the first angular direction 122A. Shaft power is supplied from the sun shaft 102 to the carrier 104 at a gear ratio determined by the sun gear coupled to the low ring gear 116A due to the constraint of stationarity applied on to the low ring gear 116A. The high ring gear 116B is unconstrained by either pawls 118AB, 118BB (neither of which ratchets on the ring gear 116B) and rotates freely in the same direction (the first angular direction 122A) that the low ring gear 116A pushes against the pawl 118BA in. The rotation rate of the high ring gear 116B may depend on the dynamical properties (e.g. response to applied torque) of the transmission 100.

To reach stage $T_1$, in FIGS. 9A-9B, the cams 130AA, 130AB are rotated about the corresponding selector axis 136, as illustrated in FIGS. 9A-9B. Such a rotation may be achieved by rotation of the selector 128 having mounted thereon cams 130AA, 130AB. The profile of the cam 130AA is configured such that a rotation (in particular direction(s)) around its selector axis 136, starting from stage $T_0$, by a predetermined amount may not substantially change engagement of the pawl 118AA with the ring gear 116A, e.g. by maintaining a position of the end 132B of the pawl 118AA as the cam 130AA is rotated. The profile of the cam 130AB is configured such that a rotation around its selector axis 136, starting from stage $T_0$, by a predetermined amount causes engagement of the pawl 118AB with the ring gear 116B by causing repositioning of the end 132B of the pawl 118AB as the cam 130AA is rotated. In this stage, the ring gear 116A remains in a stationary position due to engagement of both pawls 118AA, 118BA, similar to stage $T_0$ and the ring gear 116B remains freely rotating while the pawl 118AB ratchets thereon.

To reach stage $T_2$, in FIGS. 9A-9B, the cams 130AA, 130AB are further rotated about the corresponding selector 136, as illustrated in FIGS. 9A-9B. The profile of the cam 130AA is configured such that this further rotation, starting from stage $T_1$, results in disengagement of the pawl 118AA from the ring gear 116A by lifting of the end 132A of the pawl 118AA off of the ring gear 116A. The profile of the cam 130AB is configured such that the further rotation, starting from stage $T_1$, maintains engagement of the pawl 118AB with the ring gear 116B. In this stage, the ring gear 116A remains in a stationary position due to engagement of only the pawl 118BA, which the ring gear 116A pushes against in abutting engagement, and the ring gear 116B remains freely rotating while the pawl 118AB ratchets thereon.

To reach stage $T_3$, in FIGS. 9A-9B, the cams 130BA, 130BB are rotated about the corresponding selector axis 136, as illustrated in FIGS. 9A-9B. The profile of the cam 130BA is configured such that a rotation (in particular direction(s)) around its selector axis 136, starting from stage $T_2$, by a predetermined amount may not substantially change engagement of the pawl 118BA with the ring gear 116A, e.g. by maintaining a position of the end 132B of the pawl 118BA as the cam 130BA is rotated. The profile of the cam 130BB is configured such that a rotation around its selector axis 136, starting from stage $T_2$, by a predetermined amount causes engagement of the pawl 118BB with the ring gear 116B by causing repositioning of the end 132B of the pawl 118BB as the cam 130BB is rotated. In this stage, rotation of the ring gear 116B is arrested by the pawls 118AB, 118BB engaged therewith. As this occurs, the ring gear 116A stops pushing against the pawl 118BA (in the first angular direction 122A) and instead commences rotation in the opposite direction (in the second angular direction 122B), as illustrated in FIG. 9A, so as to cause ratcheting of the pawl 118BA on the ring gear 116A. In this stage, the ring gear 116B is in a stationary position due to engagement of both pawls 118AB, 118BB, and the ring gear 116A remains freely rotating while the pawl 118BA ratchets thereon. While stationary, the ring gear 116B pushes against the pawl 118BB (in the first angular direction 122A).

To reach stage $T_4$, in FIGS. 9A-9B, the cams 130BA, 130BB are further rotated around their selector axes 136. The profile of the cam 130BA is configured such that this further rotation, starting from stage $T_3$, results in disengagement of the pawl 118BA from the ring gear 116A by lifting of the end 132A of the pawl 118BA off of the ring gear 116A. The profile of the cam 130BB is configured such that a rotation (in particular direction(s)) around its selector axis 136, starting from stage $T_3$, by a predetermined amount may not substantially change engagement of the pawl 118BB with the ring gear 116B, e.g. by maintaining a position of the end 132B of the pawl 118BB as the cam 130BB is rotated. In this stage, the ring gear 116B is in a stationary position due to engagement of both pawls 118AB, 118BB, and the ring gear 116A remains freely rotating but without either of the pawls 118AA, 118BA ratcheting thereon.

Such sequential timing of the pawls 118AA, 118BA, 118AB, 118BB may be advantageous for smooth operation and synchronization of the gears. The use of pawls, instead of clutches or dogs that operate in a two-way manner to arrest motion, may result in lighter and smaller construction of the transmission 100 while enabling such advantageous sequential timing of gears. The timing may facilitate 'seamless' shifting aspect, which may allow one gear to be engaged while the next is selected and ready to immediately engage. This may ensure a substantially constant torque flow to the output when the shift occurs.

Figures 10A, 10B:
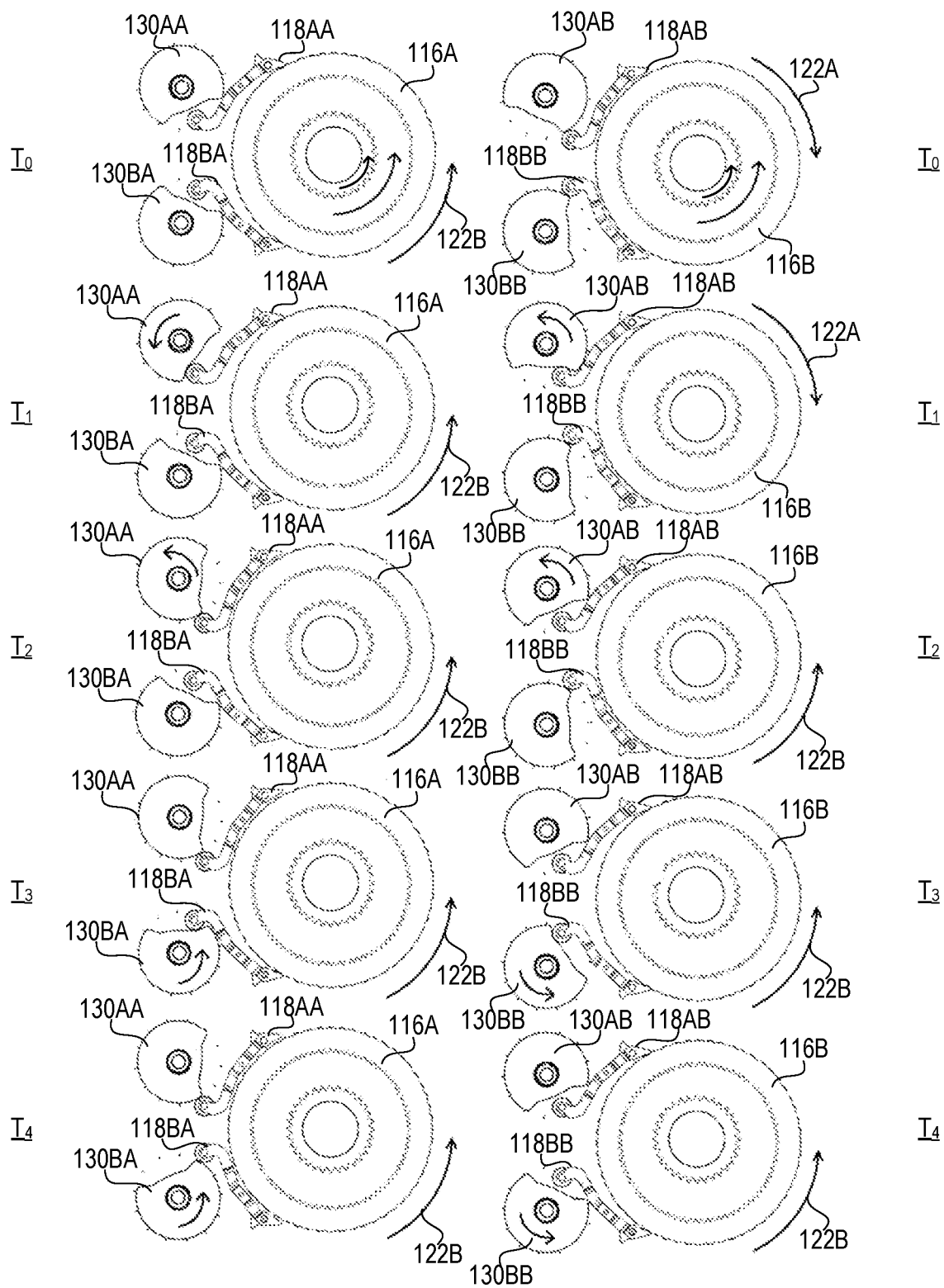
FIG. 10A is a schematic of the low ring gear during upshifting while power is transmitted from the carrier to the sun shaft, in accordance with an embodiment.
FIG. 10B is a schematic of the high ring gear during upshifting while power is transmitted from the carrier to the sun shaft, in accordance with an embodiment.

FIGS. 10A-B are schematic views of various stages of the transmission 100 as a higher gear thereof is engaged (upshifting) while input shaft work is provided via the carrier 104, in accordance with an embodiment.

For example, the transmission 100 may be coupled to a motor of a vehicle that is undergoing deceleration with the carrier 104 coupled to wheels (e.g. via a differential) of the vehicle being rotatably driven by the wheels to rotatably drive the sun shaft 102 and the motor of the vehicle coupled thereto.

FIGS. 10A-10B show five stages of the transmission 100, labelled in temporal sequence $T_0$, $T_1$, $T_2$, $T_3$, $T_4$. It is understood that, in some embodiments, these stages may partially temporally overlap.

FIG. 10A is a schematic of the low ring gear 116A, arresting of which by oppositely oriented pawls 118AA, 118BA engages a lower gear of the transmission 100, as described previously. The rotation directions of the sun shaft, and the carrier are indicated by the radially spaced apart arc-shaped arrows.

FIG. 10B is a schematic of the high ring gear 116B, engagement (or arresting) of which by oppositely oriented pawls 118AB, 118BB engages a higher gear of the transmission 100, as described previously.

In FIGS. 10A-10B, at stage $T_0$, the lower gear of the transmission 100 is engaged. At stage $T_4$, the higher gear of the transmission 100 is engaged. Stages $T_1$, $T_2$, $T_3$ are transitory stages between stages $T_0$ and $T_4$.

In FIGS. 10A-10B, the mechanical operation of the pawls 118AA, 118BA, 118AB, 118BB, actuated via rotation of respective cams 130AA, 130BA, 130AB, 130BB at various stages is identical to their mechanical operation illustrated and described in reference to corresponding stages in FIGS. 9A-9C.

In contrast to FIGS. 9A-9B, in FIGS. 10A-10B, the input power is received from the carrier 104 rather than the sun shaft 102.

As such, at stage $T_0$ in FIGS. 10A-10B, the low ring gear 116A is held stationary while it pushes against the pawl 118AA in the second angular direction 122B and the high ring gear 116B rotates freely in the first angular direction 122A.

At stage $T_1$ in FIGS. 10A-10B, the pawl 118AB ratchets against the freely rotating high ring gear 116B while the low ring gear 116A is held stationary by pushing of low ring gear 116A against the pawl 118AA.

At stage $T_2$ in FIGS. 10A-10B, unlike the corresponding stage in FIGS. 9A-9B, the low ring gear 116A rotates freely in second angular direction 122B while the pawl 118BA ratchets against it, and rotation of the high ring gear 116B is arrested by the pawl 118AB since the high ring gear 116B pushes against the pawl 118AB in the second angular direction 122B, even though the pawl 118BB remains disengaged from the high ring gear 116B. This is because, as the pawl 118AA is disengaged from the low ring gear 116A, the rotation direction of the high ring gear 116B changes momentarily before it engages with the pawl 118AB, which causes it to become stationary.

At stage $T_3$ in FIGS. 10A-10B, the pawl 118BB is lowered on to the ring gear 116B to engage therewith.

At stage $T_4$ in FIGS. 10A-10B, the pawl 118BA is lifted off of the ring gear 116A so that the ring gear 116A freely rotates without any pawls ratcheting thereon.

Figures 11A, 11B:
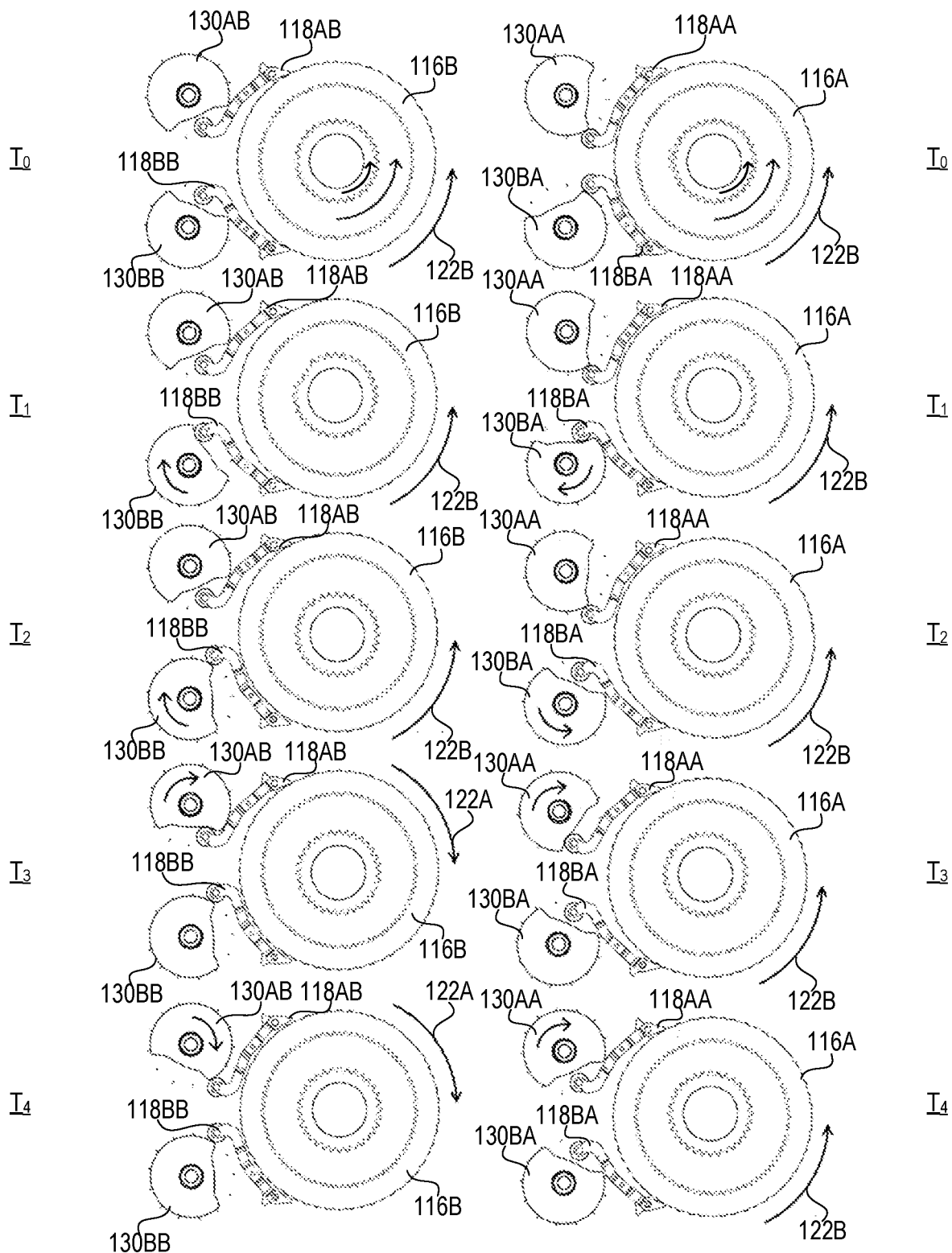
FIG. 11A is a schematic of the high ring gear during downshifting while power is transmitted from the carrier to the sun shaft, in accordance with an embodiment.
FIG. 11B is a schematic of the low ring gear during downshifting while power is transmitted from the carrier to the sun shaft, in accordance with an embodiment.

FIGS. 11A-B are schematic views of various stages of the transmission 100 as a lower gear thereof is engaged (downshifting) while input shaft work is provided via the carrier 104, in accordance with an embodiment.

FIGS. 11A-11B show five stages of the transmission 100, labelled in temporal sequence $T_0$, $T_1$, $T_2$, $T_3$, $T_4$. It is understood that, in some embodiments, these stages may partially temporally overlap. The five stages $T_0$, $T_1$, $T_2$, $T_3$, $T_4$ are analogous to the five stages illustrated in FIGS. 10A-10B and described herein.

FIG. 11A is a schematic of the high ring gear 116B, arresting of which by oppositely oriented pawls 118AB, 118BB engages a higher gear of the transmission 100, as described previously.

FIG. 11B is a schematic of the low ring gear 116A, arresting of which by oppositely oriented pawls 118AA, 118BA engages a lower gear of the transmission 100, as described previously.

In FIGS. 11A-11B, at stage $T_0$, the higher gear of the transmission 100 is engaged. At stage $T_4$, the lower gear of the transmission 100 is engaged. Stages $T_1$, $T_2$, $T_3$ are transitory stages between stages $T_0$ and $T_4$.

At stage $T_0$, in FIGS. 11A-11B, the high ring gear 116B is fully engaged by both pawls 118AB, 118BB and is therefore in a stationary position. Each of the pawls 118AB, 118BB, whose ends face each other, is rotated about its respective end 132A and/or its respective intermediate portion 134 on to the ring gear 116B. In such a stationary position, the high ring gear 116B pushes against the pawl 118AB in the second angular direction 122B. Shaft power is supplied from the sun shaft 102 to the carrier 104 at a gear ratio determined by the sun gear coupled to the high ring gear 116B due to the constraint of stationarity applied on to the high ring gear 116B. The low ring gear 116A is unconstrained by either pawls 118AA, 118BA (neither of which ratchets on the ring gear 116A) and rotates freely in the same direction (the second angular direction 122B) that the high ring gear 116B pushes against the pawl 118AB in. The rotation rate of the low ring gear 116A may depend on the dynamical properties (e.g. response to applied torque) of the transmission 100.

To reach stage $T_1$, in FIGS. 11A-11B, the cams 130BB, 130BA are rotated about the corresponding selector axis 136, as illustrated in FIGS. 11A-11B. Such a rotation may be achieved by rotation of the selector 128 having mounted thereon cams 130BB, 130BA. The profile of the cam 130BB is configured such that a rotation (in particular direction(s)) around its selector axis 136, starting from stage $T_0$, by a predetermined amount may not substantially change engagement of the pawl 118BB with the ring gear 116B, e.g. by maintaining a position of the end 132B of the pawl 118BB as the cam 130BB is rotated. The profile of the cam 130BA is configured such that a rotation around its selector axis 136, starting from stage $T_0$, by a predetermined amount causes engagement of the pawl 118BA with the ring gear 116A by causing repositioning of the end 132B of the pawl 118BA as the cam 130BA is rotated. In this stage, the ring gear 116B remains in a stationary position due to engagement of both pawls 118BB, 118AB, similar to stage $T_0$ and the ring gear 116A remains freely rotating while the pawl 118BA ratchets thereon.

To reach stage $T_2$, in FIGS. 11A-11B, the cams 130BB, 130BA are further rotated about the corresponding selector axis 136, as illustrated in FIGS. 11A-11B. The profile of the cam 130BB is configured such that this further rotation, starting from stage $T_1$, results in disengagement of the pawl 118BB from the ring gear 116B by lifting of the end 132A of the pawl 118BB off of the ring gear 116B. The profile of the cam 130BA is configured such that the further rotation, starting from stage $T_1$, maintains engagement of the pawl 118BA with the ring gear 116A. In this stage, the ring gear 116B remains in a stationary position due to engagement of only the pawl 118AB, which the ring gear 116B pushes against in abutting engagement, and the ring gear 116A remains freely rotating while the pawl 118BA ratchets thereon.

To reach stage $T_3$, in FIGS. 11A-11B, the cams 130AA, 130AB are rotated about the corresponding selector axis 136, as illustrated in FIGS. 11A-11B. The profile of the cam 130AB is configured such that a rotation (in particular direction(s)) around its selector axis 136, starting from stage $T_2$, by a predetermined amount may not substantially change engagement of the pawl 118AB with the ring gear 116B, e.g. by maintaining a position of the end 132B of the pawl 118AB as the cam 130AB is rotated. The profile of the cam 130AA is configured such that a rotation around its selector axis 136, starting from stage $T_2$, by a predetermined amount causes engagement of the pawl 118AA with the ring gear 116A by causing repositioning of the end 132B of the pawl 118AA as the cam 130AA is rotated. In this stage, rotation of the ring gear 116A is arrested by the pawls 118AA, 118BA engaged therewith. As this occurs, the ring gear 116B stops pushing against the pawl 118AB (in the second angular direction 122B) and instead commences rotation in the opposite direction (in the first angular direction 122A), as illustrated in FIG. 11A, so as to cause ratcheting of the pawl 118AB on the ring gear 116B. In this stage, the ring gear 116A is in a stationary position due to engagement of both pawls 118AA, 118BA, and the ring gear 116B remains freely rotating while the pawl 118AB ratchets thereon. While stationary, the ring gear 116A pushes against the pawl 118AA (in the second angular direction 122B).

To reach stage $T_4$, in FIGS. 11A-11B, the cams 130AA, 130AB are further rotated around their selector axes 136. The profile of the cam 130AB is configured such that this further rotation, starting from stage $T_3$, results in disengagement of the pawl 118AB from the ring gear 116B by lifting of the end 132A of the pawl 118AB off of the ring gear 116B. The profile of the cam 130AA is configured such that a rotation (in particular direction(s)) around its selector axis 136, starting from stage $T_3$, by a predetermined amount may not substantially change engagement of the pawl 118AA with the ring gear 116A, e.g. by maintaining a position of the end 132B of the pawl 118AA as the cam 130AA is rotated. In this stage, the ring gear 116A is in a stationary position due to engagement of both pawls 118AA, 118BA, and the ring gear 116B remains freely rotating but without either of the pawls 118AB, 118BB ratcheting thereon.

Figures 12A, 12B:
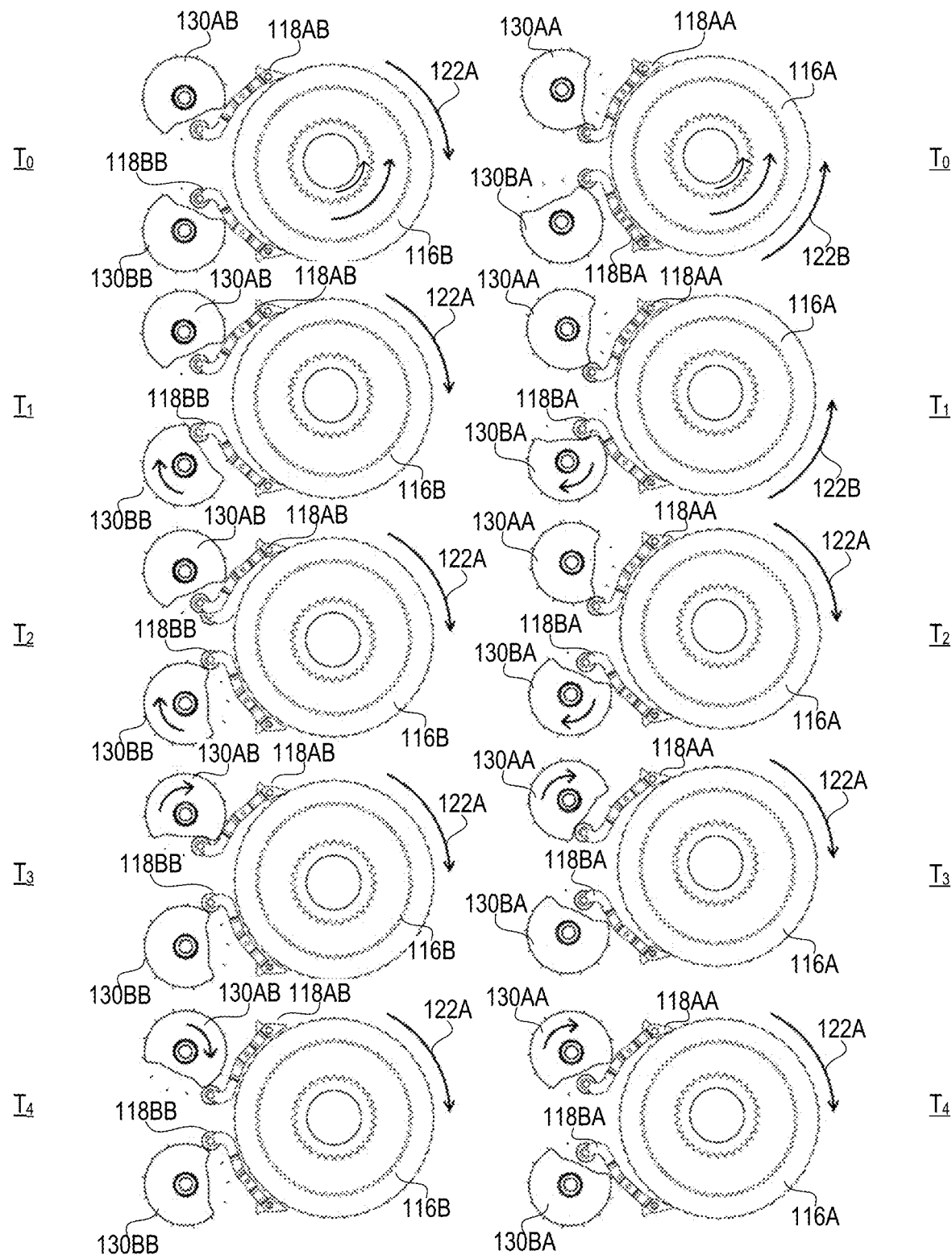
FIG. 12A is a schematic of the high ring gear during downshifting while power is transmitted from the sun shaft to the carrier, in accordance with an embodiment.
FIG. 12B is a schematic of the low ring gear during downshifting while power is transmitted from the sun shaft to the carrier, in accordance with an embodiment.

FIGS. 12A-B are schematic views of various stages of the transmission 100 as a lower gear thereof is engaged (downshifting) while input shaft work is provided via the sun shaft 102, in accordance with an embodiment.

FIGS. 12A-12B show five stages of the transmission 100, labelled in temporal sequence $T_0$, $T_1$, $T_2$, $T_3$, $T_4$. It is understood that, in some embodiments, these stages may partially temporally overlap.

In FIGS. 12A-12B, at stage $T_0$, the higher gear of the transmission 100 is engaged. At stage $T_4$, the lower gear of the transmission 100 is engaged. Stages $T_1$, $T_2$, $T_3$ are transitory stages between stages $T_0$ and $T_4$.

FIG. 12A is a schematic of the high ring gear 116B, arresting of which by oppositely oriented pawls 118AB, 118BB engages a higher gear of the transmission 100, as described previously. The rotation directions of the sun shaft 102, and the carrier 104 are indicated by the radially spaced apart arc-shaped arrows.

FIG. 12B is a schematic of the low ring gear 116A, engagement (or arresting) of which by oppositely oriented pawls 118AA, 118BA engages a lower gear of the transmission 100, as described previously.

In FIGS. 12A-12B, the mechanical operation of the pawls 118AA, 118BA, 118AB, 118BB, actuated via rotation of respective cams 130AA, 130BA, 130AB, 130BB at various stages is identical to their mechanical operation illustrated and described in reference to corresponding stages in FIGS. 11A-11C.

In contrast to FIGS. 11A-11B, in FIGS. 12A-10B, the input power is received from the sun shaft 102 rather than the carrier 104.

As such, at stage $T_0$ in FIGS. 12A-12B, the high ring gear 116B is held stationary while it pushes against the pawl 118BB in the first angular direction 122A and the low ring gear 116A rotates freely in the second angular direction 122B.

At stage $T_1$ in FIGS. 12A-12B, the pawl 118BA ratchets against the freely rotating low ring gear 116A while the high ring gear 116B is held stationary by pushing of high ring gear 116B against the pawl 118BB.

At stage $T_2$ in FIGS. 12A-12B, unlike the corresponding stage in FIGS. 11A-11B, the high ring gear 116B rotates freely in the first angular direction 122A while the pawl 118AB ratchets against it, and rotation of the low ring gear 116A is arrested by the pawl 118BA since the low ring gear 116A pushes against the pawl 118BA in the first angular direction 122A, even though the pawl 118AA remains disengaged from the low ring gear 116A.

This is because, as the pawl 118BB is disengaged from the high ring gear 116B, the rotation direction of the low ring gear 116A changes momentarily before it engages with the pawl 118BA, which causes it to become stationary.

At stage $T_3$ in FIGS. 12A-12B, the pawl 118AA is lowered on to the ring gear 116A to engage therewith.

At stage $T_4$ in FIGS. 12A-12B, the pawl 118AB is lifted off of the ring gear 116B so that the ring gear 116B freely rotates without any pawls ratcheting thereon.

FIGS. 13A-13C are exemplary profiles of cams forming the selectors.

FIG. 13A is a view of a cam 130A for actuating a pawl configured to engage with a first ring gear 116, in accordance with an embodiment.

FIG. 13B is a view of a cam 130B for actuating a pawl configured to engage with a second ring gear 116 that is associated with a gear of the transmission 100 higher than the gear associated with the ring gear 116 of FIG. 13A, in accordance with an embodiment.

FIG. 13C is a view of a cam 130C for actuating a pawl configured to engage with a third ring gear 116 that is associated with a gear of the transmission 100 higher than the gear associated with the ring gear 116 of FIG. 13B, in accordance with an embodiment.

FIG. 13D is a view of a cam 130D for actuating a pawl configured to engage with a fourth ring gear 116 that is associated with a gear of the transmission 100 higher than the gear associated with the ring gear 116 of FIG. 13C, in accordance with an embodiment.

FIG. 13E is a view of a cam 130E for actuating a pawl configured to engage with a fifth ring gear 116 that is associated with a gear of the transmission 100 higher than the gear associated with the ring gear 116 of FIG. 13D, in accordance with an embodiment.

FIG. 13F is a view of a cam 130F for actuating a pawl configured to engage with a sixth ring gear 116 that is associated with a gear of the transmission 100 higher than the gear associated with the ring gear 116 of FIG. 13E, in accordance with an embodiment.

FIG. 13G is a view of a cam 130G for actuating a pawl configured to engage with a seventh ring gear 116 that is associated with a gear of the transmission 100 higher than the gear associated with the ring gear 116 of FIG. 13F, in accordance with an embodiment.

Figure 14:
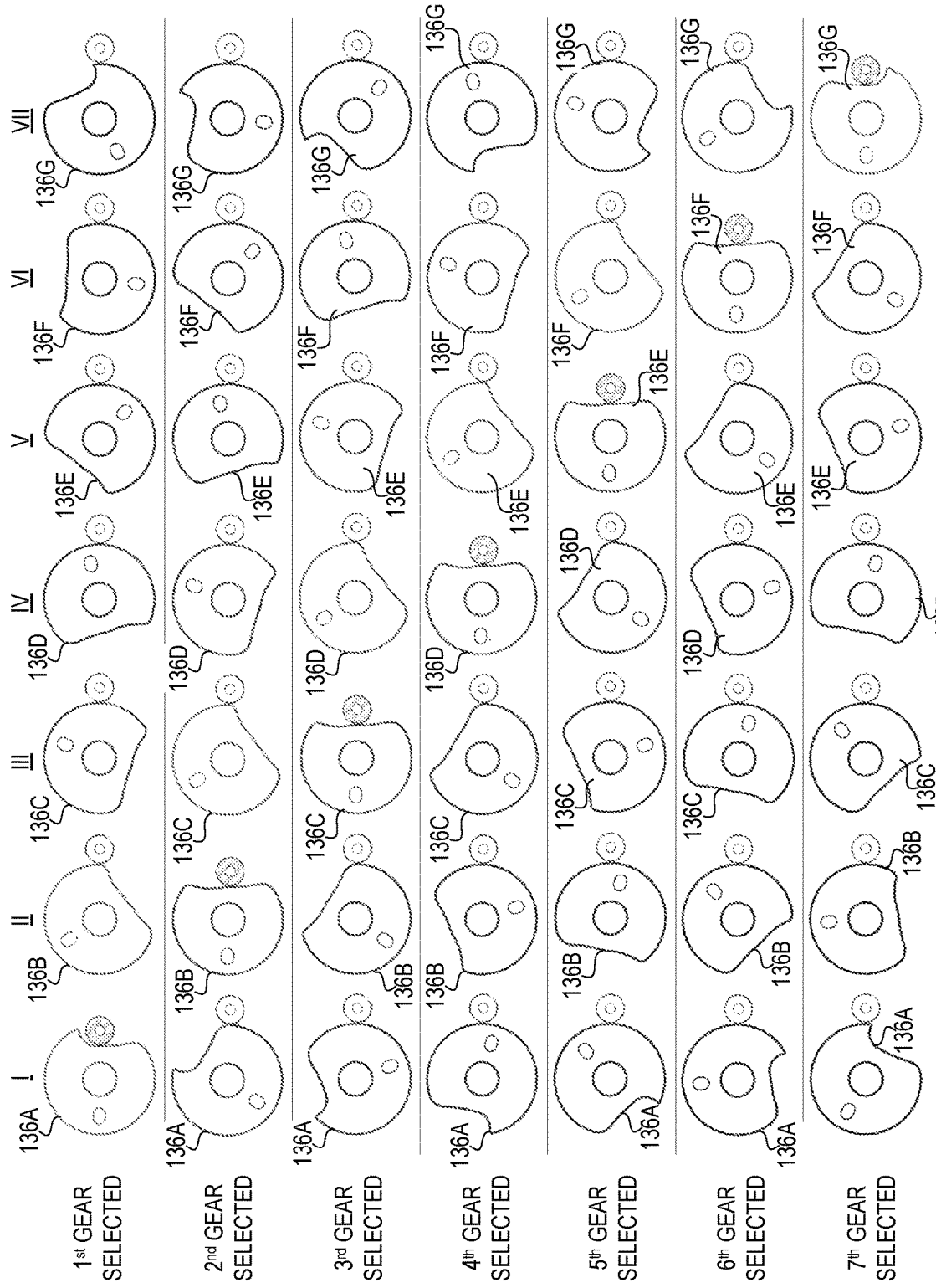
FIG. 14 is schematic showing positions of the cams of the FIGS. 13A-13G while various gears of the transmission are engaged, in accordance with an embodiment.

FIG. 14 is schematic showing positions of the cams 130A-130G while various gears of the transmission 100 are engaged.

The cams 130A-130G are coupled together axially in series along a selector axis 136 so as to form a selector 128. The cams 130A-130G may be configured to rotate in common about the selector axis 136. In various embodiments, the cams 130A-130G are mounted on to a common shaft defining the selector axis 136. The common shaft may be rotatably driven by an actuator so as to rotate all the cams 130A-130G together.

The cams 130A-130G in FIGS. 13A-13G have a respective (circular) arc-shaped portion and a respective notched portion. Each of the cams 130A-130G define a respective pair of actuating corners 162A, 162B defined generally at the confluence (or intersection) of corresponding arc-shaped portion and notched portion. As illustrated in FIGS. 9A-9B, 10A-10B, 11A-11B, 12A-12B, and FIG. 14, pawl actuation may be achieved as pawl rollers pass from the arc-shaped portions to notched portions, i.e. the actuating corners 162A, 162B may serve to reposition pawl ends so as to cause pawl actuation to cause pawl engagement or disengagement with respective ring gears 116.

When coupled together to form the selector 128, the cams 130A-130G may be maintained in fixed angular position relative to each other, i.e. the cams 130A-130G may be configured to rotate around the selector 136 solely in rigid unison with each other. The relative angular spacing between adjacent cams of the cams 130A-130G may be defined so that the corners 162A of the cams 130A-130G are staggered relative to each other. A corner 162A of a cam may be spaced apart from a corner 162A of an axially adjacent cam (or, alternatively, a cam that is adjacent in the sense of gear ratios, even though the cam may not be axially adjacent) by a fixed angular distance less than 360° in a particular direction. The corners 162A of any two axially adjacent cams (or, alternatively, cams that are adjacent in the sense of gear ratios, even though such cams may not be axially adjacent) of the cams 130A-130G may be angularly spaced apart from each in that same particular direction. In various embodiments, a total angular spacing measured sequentially from the cam 130A to the cam 130G may not exceed 360°. As illustrated in FIGS. 13A-16G, the corners 162B of the cams 130A-130G may be similarly arranged in sequential angular arrangement.

In various embodiments, the cam 160A, associated with the lowest gear of the transmission 100 may have a corner 162A that is "hooked" to provide a greater impediment to actuation than the other corner 162B and corners 162A, 162B of the cams 130B-130F, associated with higher gears of the transmission 100 (except for the highest gear).

Similarly, in various embodiments, the cam 160B, associated with the highest gear of the transmission 100 may have a corner 162B that is "hooked" to provide a greater impediment to actuation than the other corner 162A and corners 162A, 162B of the cams 130B-130F, associated with lower gears of the transmission 100 (except for the lowest gear).

In some embodiments, instead of two cams 160A, 160B, actuation of pawls may be achieved using a single body having cam profiles for both pawls 118A, 118B. Such a body would define axially separated grooves that each define a cam profile of the cam profiles of the pawls 118A, 118B. The pawls 118A, 118B may be axially separated from each other so as to track their own groove in the body.

Figure 15:
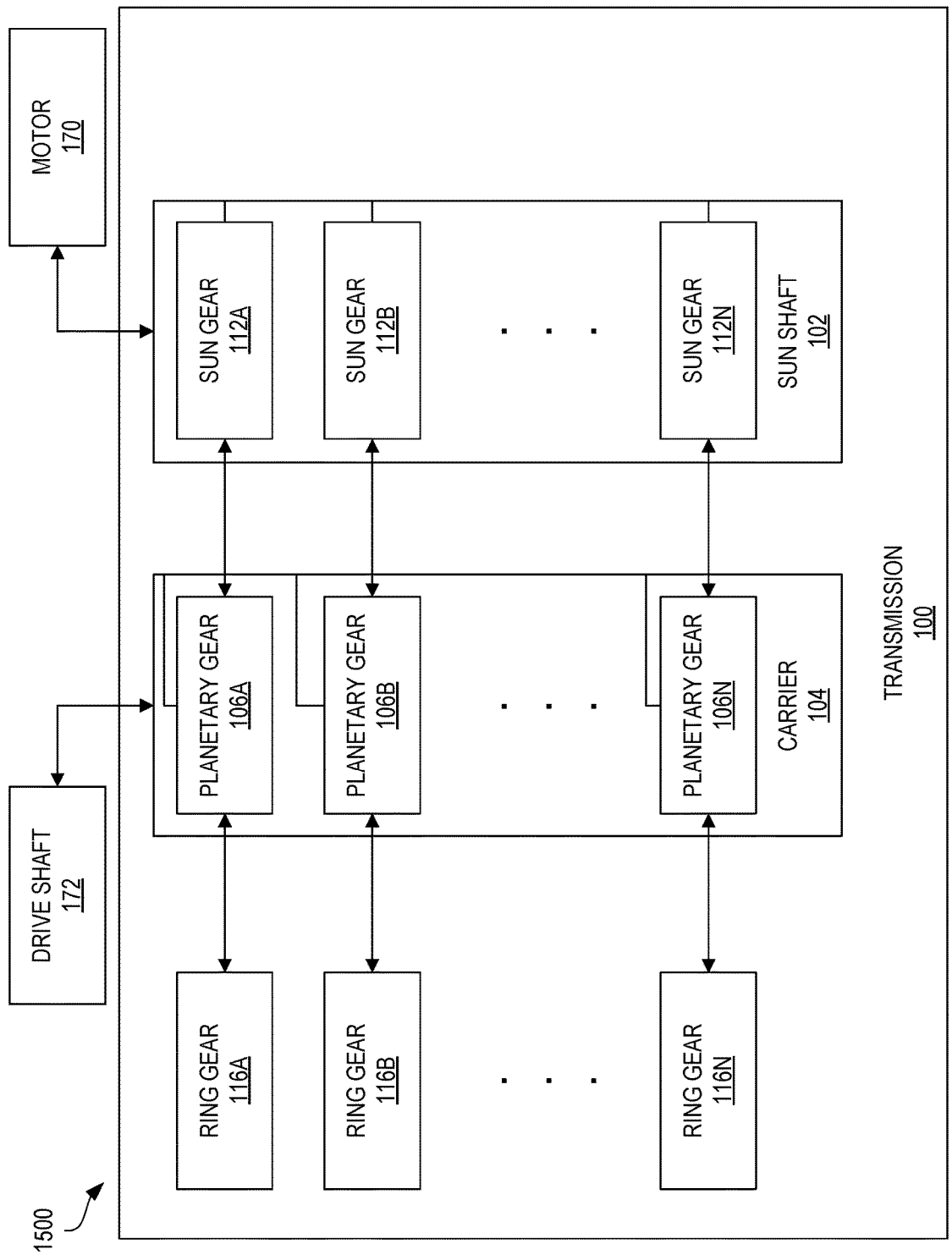
FIG. 15 is a schematic view of a system employing a transmission 100, in accordance with an embodiment.

FIG. 15 is a schematic view of a system 1500 employing a transmission 100, in accordance with an embodiment.

In various embodiments, the system 1500 may be a car, electric bike, airplane, or other transportation platform. In some embodiments, the system 1500 may be powered by combustion, e.g. via a gas turbine engine, or internal combustion engine.

The system 1500 may comprise a motor 170 configured to generate input shaft work. For example, the motor 170 may be an electric motor or internal combustion engine motor. The transmission 100 may be mechanically coupled to the motor 170 to be driven by the motor 170. A sun shaft 102 of the transmission 100 may be drivably coupled to the motor 170 to receive input from the motor 170. A carrier 104 of the transmission 100 may be drivably coupled to a drive shaft 172 to supply output from the transmission 100 to the drive shaft 172 via an input-output path, illustrated by arrows in FIG. 15, through the transmission 100. In various embodiments, the transmission 100 may be configured as a gear reducer.

In some embodiments, the motor 170 may be coupled to the carrier 104 to provide input shaft work and the drive shaft coupled to the sun shaft 102 to receive output shaft work. For example, in some embodiments, such a configuration may be particularly suitable for operating the transmission 100 as a gear multiplier.

As illustrated in FIG. 15, the transmission 100 may be an N-speed transmission, e.g. N=2, 4, 7, or 12 in various embodiments. As such, the transmission 100 may comprise N sun gears 112A, 112B, . . . , 112N, N number of planetary gears 106A, 106B, . . . , 106N coupled to the respective sun gears 112A, 112B, . . . , 112N, and N number of ring gears 116A, 116B, . . . , 116N coupled to respective planetary gears 106A, 106B, . . . , 106N. Each of the ring gears 116A, 116B, . . . , 116N may define a corresponding pair of pawls 118A, 118B that may be actuated to engage therewith, and disengage with other ring gears 116, to engage a particular gear of the transmission 100.

Such a configuration is found to be particular advantageous as it may allow lower gross weight, smaller size, and lower manufacturing costs, as well as serviceability. For example, since the input-output path pass through the carrier 104 and the sun shaft 102, the ring gears 116 may be actuated to achieve gear changes, which is advantageous gear-actuating mechanisms (here, pawls) may be positioned radially outwardly of the transmission 100. For example, pawls as gear-actuating mechanisms may be particularly advantageous for the above reasons.

In various embodiments, one or more additional planetary gearsets may be employed between the motor 170 and the drive shaft 172 to increase the overall available range of gear ratios.

Figure 16:
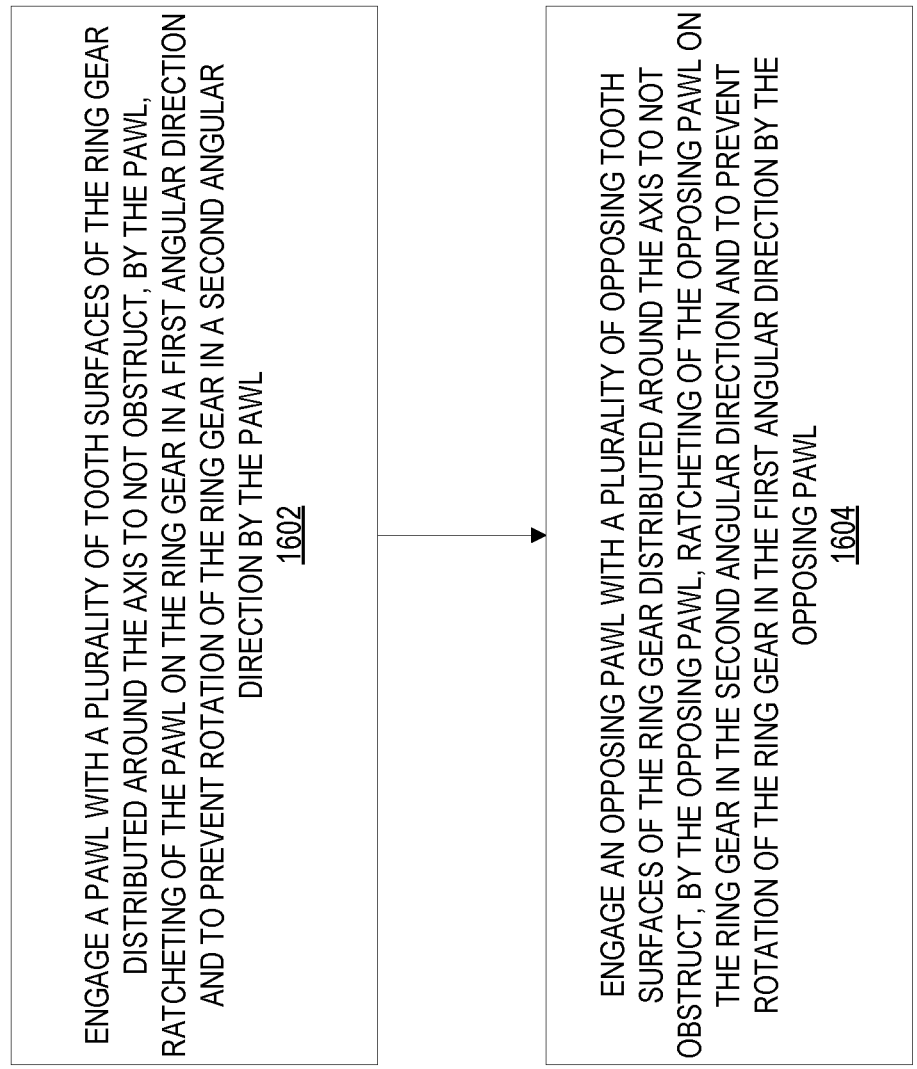
FIG. 16 is a flow chart of an exemplary method of operating a transmission.

FIG. 16 is a flow chart of an exemplary method 1600 of operating a transmission.

Such a transmission may define a sun gear that is coupled coaxially, via at least one planetary gear supported by a carrier, to a ring gear for rotation around an axis. Such a transmission may be configured to receive an input to supply an output in response to arresting of rotation of the ring gear around the axis.

Step 1602 of the method 1600 includes engaging a pawl with a plurality of tooth surfaces of the ring gear distributed around the axis to not obstruct, by the pawl, ratcheting of the pawl on the ring gear in a first angular direction and to prevent rotation of the ring gear in a second angular direction by the pawl, the first and second angular directions being opposite to each other and lateral to the axis.

Step 1604 of the method 1600 includes engaging an opposing pawl with a plurality of opposing tooth surfaces of the ring gear distributed around the axis to not obstruct, by the opposing pawl, ratcheting of the opposing pawl on the ring gear in the second angular direction and to prevent rotation of the ring gear in the first angular direction by the opposing pawl.

Some embodiments of the method 1600 include, while the pawl and the opposing pawl are engaged with the ring gear to arrest rotation of the ring gear, rotatably driving the sun gear to drive the carrier.

In some embodiments of the method 1600, the sun gear is a first sun gear of a plurality of integrally coupled sun gears defining a sun shaft.

In some embodiments of the method 1600, the plurality of tooth surfaces and the plurality of opposing tooth surfaces are disposed circumferentially around a radially outer end of the ring gear, each tooth surface of the plurality of tooth surfaces and a corresponding opposing tooth surface of the plurality of tooth surfaces being opposite surfaces of a corresponding common tooth of the ring gear.

In some embodiments of the method 1600, the common tooth is symmetric about a radial plane.

In some embodiments of the method 1600, the plurality of tooth surfaces and the plurality of opposing tooth surfaces are axially co-located, each of the plurality of tooth surfaces facing one of the plurality of opposing tooth surfaces.

Some embodiments of the method 1600 include, while the pawl is ratcheting on the ring gear, supporting the pawl using a plurality of protrusions axially co-located with the plurality of tooth surfaces, each protrusion of the plurality of protrusions extending radially in-between a corresponding tooth surface of the plurality of tooth surfaces and a corresponding opposing tooth surface of the plurality of opposing tooth surfaces.

In some embodiments of the method 1600, each protrusion of the plurality of protrusions tapers from a radially-inner end adjacent to the corresponding tooth surface and an opposing radially-inner end adjacent to the corresponding opposing tooth surface.

In some embodiments of the method 1600, engaging the pawl with the tooth surface includes ratcheting the pawl on the ring gear in the first angular direction, and engaging the opposing pawl with the opposing tooth surface includes arresting rotation of the ring gear in the first angular direction after the pawl is ratcheting on the ring gear in the first angular direction.

In some embodiments of the method 1600, the sun gear is a first sun gear, the at least one planetary gear is a first at least one planetary gear, the ring gear is a first ring gear, the pawl is a first pawl, the opposing pawl is a first opposing pawl, the plurality of tooth surfaces is a first plurality of tooth surfaces, and the plurality of opposing tooth surfaces is a first plurality of opposing tooth surfaces, and the transmission further defines a second sun gear that is coupled coaxially, via a second at least one planetary gear supported by the carrier, to a second ring gear for rotation around the axis, the transmission being configured to change a gear ratio between the input and the output by arresting the rotation of the second ring gear around the axis while allowing free rotation of the first ring gear around the axis.

Some embodiments of the method 1600 include, while rotation of the first ring gear is arrested, engaging a second pawl with a second plurality of tooth surfaces of the second ring gear distributed around the axis to ratchet the second pawl on the second ring gear in the first angular direction.

Some embodiments of the method 1600 include, while the second pawl is ratcheting on the second ring gear, disengaging the first pawl from the first plurality of tooth surfaces.

Some embodiments of the method 1600 include, while the first pawl is disengaged from the first plurality of tooth surfaces, engaging a second opposing pawl with a second plurality of opposing tooth surfaces of the second ring gear distributed around the axis to arrest rotation of the second ring gear.

Some embodiments of the method 1600 include, while rotation of the second ring gear is arrested by the second pawl and the second opposing pawl, disengaging the first opposing pawl from the first plurality of opposing tooth surfaces to allow free rotation of the first ring gear.

Figure 17:
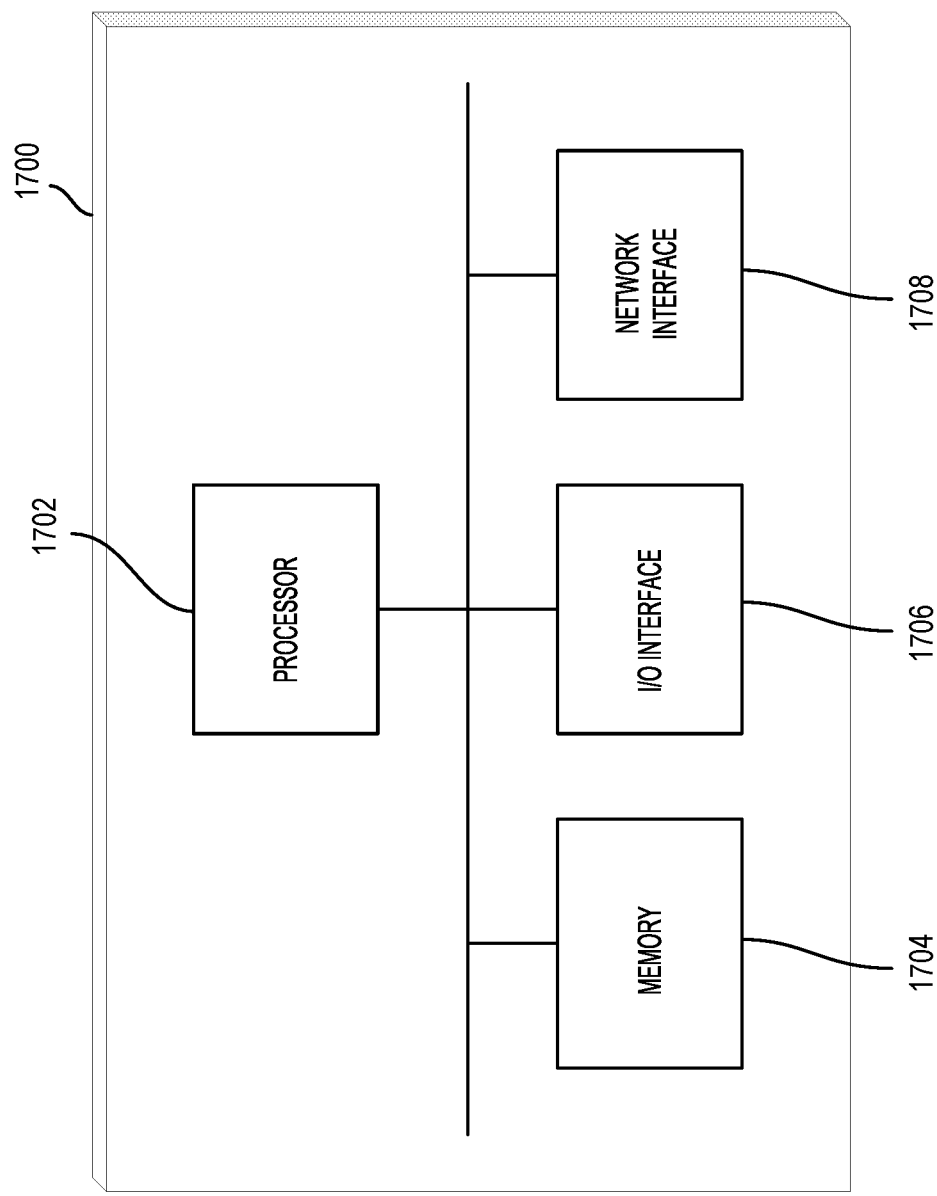
FIG. 17 illustrates a block diagram of a computing device, in accordance with an embodiment of the present application.

FIG. 17 illustrates a block diagram of a computing device 1700, in accordance with an embodiment of the present application.

As an example, the method 1600 and/or actuation of pawls 118A, 118B in the transmission 100 or the system 1500, may be implemented using the example computing device 1700 of FIG. 17. For example, the computing device 1700 may be a controller or be part of a controller coupled to motor(s) configured to actuate the pawls 118A, 118B.

The computing device 1700 includes at least one processor 1702, memory 1704, at least one I/O interface 1706, and optionally a network communication interface 1708.

The processor 1702 may be a microprocessor or microcontroller, a digital signal processing (DSP) processor, an integrated circuit, a field programmable gate array (FPGA), a reconfigurable processor, a programmable read-only memory (PROM), or combinations thereof.

The memory 1704 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

The I/O interface 1706 may enable the computing device 1700 to interconnect with one or more input devices, such as a gear selection button(s), interfacing cable, keyboard, mouse, camera, touch screen and a microphone, or with one or more output devices such as a display screen and a speaker.

In some embodiments, the memory 1704 may include non-transitory computer-readable memory that, when executed, is configured to carry out one or methods of actuating the pawls 118A, 118B. In some embodiments, in response to receiving an input via the I/O interface 1706 indicative a desired gear, or a desired gear shift direction (upshift or downshift), the processor 1702 generates a signal to power a motor (e.g. an electrical motor) that drivably rotate the selectors 128 about their axes to rotate the cams 130 to reposition the pawls 118A, 118B so as to cause one or more of the pawls 118A, 118B to engage or disengage with one or more of the ring gears 116, as described. For example, the processor 1702 may generate a signal for a motor driver.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, pawls may each be individually actuated by individually controlled cams, the transmission may include or be paired with one or more additional planetary gear systems to increase the range of available gear ratios, and/or pawls may be actuated via mechanical means without substantial electrical actuation. Yet further modifications could be implemented by a person of ordinary skill in the art in view of the present disclosure, which modifications would be within the scope of the present technology.

What is claimed is:

1. A ring gear for a planetary gearset that defines a sun gear coupled coaxially, via at least one planetary gear supported by a carrier, to the ring gear for rotation around an axis, the planetary gearset configured to receive an input to supply an output in response to arresting of rotation of the ring gear around the axis, the ring gear comprising:
   gear teeth to engage the ring gear with the at least one planetary gear;
   a plurality of tooth surfaces distributed around the axis to, while a pawl is engaged with the plurality of tooth surfaces to permit ratcheting of the pawl on the ring gear in a first angular direction, arrest rotation of the ring gear in a second angular direction by the pawl, the first and second angular directions being opposite to each other and lateral to the axis;
   a plurality of opposing tooth surfaces distributed around the axis to, while an opposing pawl is engaged with the plurality of opposing tooth surfaces to permit ratcheting of the opposing pawl on the ring gear in the second angular direction, arrest rotation of the ring gear in the first angular direction by the opposing pawl; and
   a plurality of protrusions axially co-located with the plurality of tooth surfaces for supporting the pawl and the opposing the pawl during ratcheting, each protrusion of the plurality of protrusions extending radially in-between a corresponding tooth surface of the plurality of tooth surfaces and a corresponding opposing tooth surface of the plurality of opposing tooth surfaces, wherein the plurality of tooth surfaces and the plurality of opposing tooth surfaces are axially co-located, each of the plurality of tooth surfaces facing one of the plurality of opposing tooth surfaces.

2. The ring gear of claim 1, wherein the plurality of tooth surfaces and the plurality of opposing tooth surfaces are disposed circumferentially around an outer end of the ring gear such that each of the plurality of tooth surfaces is disposed in-between two of the plurality of opposing tooth surfaces.

3. The ring gear of claim 1, wherein the protrusion tapers from a radially-inner end adjacent to the corresponding tooth surface and an opposing radially-inner end adjacent to the corresponding opposing tooth surface.

4. A system for a planetary gearset that defines a sun gear configured to rotate around an axis, comprising:
   a pawl;
   an opposing pawl; and
   a ring gear according to claim 1, the ring gear configured to engage with the pawl and the opposing pawl.

5. The ring gear of claim 1, wherein the plurality of tooth surfaces and the plurality of opposing tooth surfaces are disposed circumferentially around an outer end of the ring gear, each tooth surface of the plurality of tooth surfaces and a corresponding opposing tooth surface of the plurality of tooth surfaces being opposite surfaces of a corresponding common tooth of the ring gear.

6. The ring gear of claim 5, wherein the common tooth is symmetric about a radial plane.

7. A method of operating a transmission defining a sun gear that is coupled coaxially, via at least one planetary gear supported by a carrier, to a ring gear for rotation around an axis, the transmission configured to receive an input to supply an output in response to arresting of rotation of the ring gear around the axis, the method comprising:
- engaging a pawl with a plurality of tooth surfaces of the ring gear distributed around the axis to not obstruct, by the pawl, ratcheting of the pawl on the ring gear in a first angular direction and to prevent rotation of the ring gear in a second angular direction by the pawl, the first and second angular directions being opposite to each other and lateral to the axis;
- engaging an opposing pawl with a plurality of opposing tooth surfaces of the ring gear distributed around the axis to not obstruct, by the opposing pawl, ratcheting of the opposing pawl on the ring gear in the second angular direction and to prevent rotation of the ring gear in the first angular direction by the opposing pawl; and
- while the pawl is ratcheting on the ring gear, supporting the pawl using a plurality of protrusions axially co-located with the plurality of tooth surfaces, each protrusion of the plurality of protrusions extending radially in-between a corresponding tooth surface of the plurality of tooth surfaces and a corresponding opposing tooth surface of the plurality of opposing tooth surfaces.

8. The method of claim 7, further comprising:
- while the pawl and the opposing pawl are engaged with the ring gear to arrest rotation of the ring gear, rotatably driving the sun gear to drive the carrier.

9. The method of claim 7, wherein the sun gear is a first sun gear of a plurality of integrally coupled sun gears defining a sun shaft.

10. The method of claim 7, wherein the plurality of tooth surfaces and the plurality of opposing tooth surfaces are disposed circumferentially around an outer end of the ring gear, each tooth surface of the plurality of tooth surfaces and a corresponding opposing tooth surface of the plurality of tooth surfaces being opposite surfaces of a corresponding common tooth of the ring gear.

11. The method of claim 10, wherein the common tooth is symmetric about a radial plane.

12. The method of claim 7, wherein the plurality of tooth surfaces and the plurality of opposing tooth surfaces are axially co-located, each of the plurality of tooth surfaces facing one of the plurality of opposing tooth surfaces.

13. The method of claim 7, wherein each protrusion of the plurality of protrusions tapers from a radially-inner end adjacent to the corresponding tooth surface and an opposing radially-inner end adjacent to the corresponding opposing tooth surface.

14. The method of claim 7, wherein engaging the pawl with the plurality of tooth surfaces includes ratcheting the pawl on the ring gear in the first angular direction, and engaging the opposing pawl with the plurality of opposing tooth surfaces includes arresting rotation of the ring gear in the first angular direction after the pawl is ratcheting on the ring gear in the first angular direction.

15. The method of claim 7, wherein the sun gear is a first sun gear, the at least one planetary gear is a first at least one planetary gear, the ring gear is a first ring gear, the pawl is a first pawl, the opposing pawl is a first opposing pawl, the plurality of tooth surfaces is a first plurality of tooth surfaces, and the plurality of opposing tooth surfaces is a first plurality of opposing tooth surfaces, and the transmission further defines a second sun gear that is coupled coaxially, via a second at least one planetary gear supported by the carrier, to a second ring gear for rotation around the axis, the transmission being configured to change a gear ratio between the input and the output by arresting the rotation of the second ring gear around the axis while allowing free rotation of the first ring gear around the axis, the method further comprising:
- while rotation of the first ring gear is arrested, engaging a second pawl with a second plurality of tooth surfaces of the second ring gear distributed around the axis to ratchet the second pawl on the second ring gear in the first angular direction;
- while the second pawl is ratcheting on the second ring gear, disengaging the first pawl from the first plurality of tooth surfaces;
- while the first pawl is disengaged from the first plurality of tooth surfaces, engaging a second opposing pawl with a second plurality of opposing tooth surfaces of the second ring gear distributed around the axis to arrest rotation of the second ring gear; and
- while rotation of the second ring gear is arrested by the second pawl and the second opposing pawl, disengaging the first opposing pawl from the first plurality of opposing tooth surfaces to allow free rotation of the first ring gear.

16. A transmission configured to receive an input so as to supply an output via an input-output path, comprising:
- a sun shaft defining a plurality of sun gears integrally coupled to each other for common rotation around an axis;
- a plurality of planetary gears engaged with the plurality of sun gears;
- a carrier supporting the plurality of planetary gears so as to rotate around the axis in common with the plurality of planetary gears;
- a plurality of bi-directional ratchets defining a plurality of ring gears, each of the plurality of bi-directional ratchets including
  - a corresponding ring gear of the plurality of ring gears coupled to a corresponding sun gear of the plurality of sun gears via a corresponding planetary gear of the plurality of planetary gears for rotation around the axis, the corresponding ring gear defining
    - a corresponding plurality of tooth surfaces distributed around the axis for ratcheting, and
    - a corresponding plurality of opposing tooth surfaces distributed around the axis for ratcheting,
  - a corresponding pawl configured to be actuatable to engage with the corresponding plurality of tooth surfaces to allow ratcheting rotation of the corresponding ring gear in a first angular direction while preventing rotation of the corresponding ring gear in a second angular direction opposite to the first angular direction, and
  - a corresponding opposing pawl configured to be actuatable to engage with the corresponding plurality of opposing tooth surfaces to allow ratcheting rotation of the corresponding ring gear in the second angular direction while preventing rotation of the corresponding ring gear in the first angular direction; and an actuator coupled to the plurality of bi-directional ratchets to actuate the plurality of bi-directional ratchets to change a gear ratio between the input and the output by causing a pawl of the plurality of bi-directional ratchets and an opposing pawl of the plurality of bi-directional ratchets to hold stationary a ring gear of the bi-directional ratchets while allowing ring gears of the bi-directional ratchets other than the ring gear to rotate without ratcheting so as to establish the input-output path between the carrier and a sun gear of the sun shaft coupled to the ring gear, wherein:

the ring gear defines a tooth surface and an opposing tooth surface spaced apart from, axially co-located with, and facing the tooth surface; and the ring gear further comprises a protrusion extending radially in-between the tooth surface and the opposing tooth surface to support the pawl and the opposing pawl, the protrusion tapering from a radially-inner end adjacent to the tooth surface and an opposing radially-inner end adjacent to the opposing tooth surface.

17. The transmission of claim 16, further comprising a selector, including a plurality of cams drivably coupled to the actuator, a cam of the plurality of cams being positioned to cause a first end of the pawl to follow the cam to selectively draw a second end of the pawl on to the ring gear of the plurality of bi-directional ratchets by rotational driving of the cam by the actuator.

18. The transmission of claim 17, wherein the actuator is a motor, the selector is a first selector and the plurality of cams are a first plurality of cams, the first selector further comprising a first gear coupled for common rotation with the first plurality of cams, the transmission further comprising:

a second selector, including a second plurality of cams drivably coupled to the actuator, a second cam of the second plurality of cams being positioned to cause a first end of the opposing pawl to follow the second cam to selectively draw a second end of the opposing pawl on to the ring gear by rotational driving of the second cam by the actuator, and a second gear coupled for common rotation with the second plurality of cams; and a third gear drivably coupled to the motor and disposed between the first and second gears to drivably engage with each of the first and second gears to change the gear ratio.

19. The transmission of claim 18, wherein the pawl is spaced apart from and disposed on a first side of a plane passing through the axis, and the opposing pawl is spaced apart from and disposed on a second side of the plane opposite the first side.

20. The transmission of claim 16, further comprising a unitary gear separator defining a plurality of spacers that are axially separated and integrally coupled to each other, each of the plurality of spacers extending radially in-between a corresponding pair of ring gears of the plurality of ring gears to mitigate axial movement of the plurality of ring gears, a radially outer end of the gear separator being disposed radially outwardly of the plurality of ring gears.

\* \* \* \* \*